(12) United States Patent
Vilim et al.

(10) Patent No.: US 9,574,903 B2
(45) Date of Patent: Feb. 21, 2017

(54) TRANSIENT MULTIVARIABLE SENSOR EVALUATION

(71) Applicant: UCHICAGO ARGONNE, LLC, Chicago, IL (US)

(72) Inventors: Richard B. Vilim, Sugar Grove, IL (US); Alexander Heifetz, Buffalo Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 486 days.

(21) Appl. No.: 14/134,790

(22) Filed: Dec. 19, 2013

(65) Prior Publication Data

US 2015/0177030 A1 Jun. 25, 2015

(51) Int. Cl.
| | |
|---|---|
| G06F 17/18 | (2006.01) |
| G06F 19/00 | (2011.01) |
| G01D 3/08 | (2006.01) |
| G06K 9/00 | (2006.01) |

(52) U.S. Cl.
CPC .......... *G01D 3/08* (2013.01); *G06K 9/00563* (2013.01)

(58) Field of Classification Search
CPC .... G05B 13/048; G05B 17/02; G05B 13/042; G05B 13/027; G05B 13/045; H04J 11/005; H04J 11/0023; G06K 9/00496; G06K 9/00563; G06F 2217/16; G06F 17/18; G06F 17/5009; G06F 17/5018; G06F 9/48

See application file for complete search history.

(56) References Cited

U.S. PATENT DOCUMENTS

| 6,091,361 A | * | 7/2000 | Davis | G01S 3/74 342/195 |
|---|---|---|---|---|
| 2013/0238146 A1 | * | 9/2013 | Vau | F16F 15/002 700/280 |

OTHER PUBLICATIONS

Lee et al. Adaptive Independent Vector Analysis for the Separation of Convoluted Mixtures using EM Algorithm, University of Cali. San Diego, 2008.*
Nygaard, Multivariable process control in high temperature and high pressure enviornment using non-intrusive multi sensor data fusion, Sep. 2006.*
Thomas, K., and Hallbert, B., "Long-Term Instrumentation, Information, and Control Systems (II&C) Modernization Future Vision and Strategy", Idaho National Laboratory, Feb. 2012, 64 pages.
Herzog, J.P., et al., "Theoretical Basis of the Multivariate State Estimation Technique (MSET)", Argonne National Laboratory, Dec. 1997, 84 pages.
Vilim, R.B., "Advanced Methods for Resilient Plant Operation—ANL NEET Projects", Argonne National Laboratory, Oct. 2012, 32 pages.

(Continued)

*Primary Examiner* — Roy Y Yi
(74) *Attorney, Agent, or Firm* — Foley & Lardner LLP

(57) ABSTRACT

A method and system for performing transient multivariable sensor evaluation. The method and system includes a computer system for identifying a model form, providing training measurement data, generating a basis vector, monitoring system data from sensor, loading the system data in a non-transient memory, performing an estimation to provide desired data and comparing the system data to the desired data and outputting an alarm for a defective sensor.

12 Claims, 27 Drawing Sheets

(56) References Cited

OTHER PUBLICATIONS

Vilim, R.B. et al., "Description of Fault Detection and Identification Algorithms for Sensor and Equipment Failures and Preliminary Tests Using Simulations", Argonne National Laboratory, Nov. 2012, 56 pages.

Vilim, R.B., "Data-Driven Estimation for Dynamic Systems: Theory and Properties", Argonne National Laboratory, Jan. 2013, 22 pages.

Vilim, R.B., et al., "Description of Algorithms for Detecting Sensor Degradation and Preliminary Tests Using Simulations", Argonne National Laboratory, Feb. 2013, 56 pages.

Heifetz, A., et al., "Sensor Degradation Control Systems: Comprehensive Tests Using Simulations of New Algorithms for Detecting Sensor Degradation", Argonne National Laboratory, Sep. 2013, 59 pages.

* cited by examiner

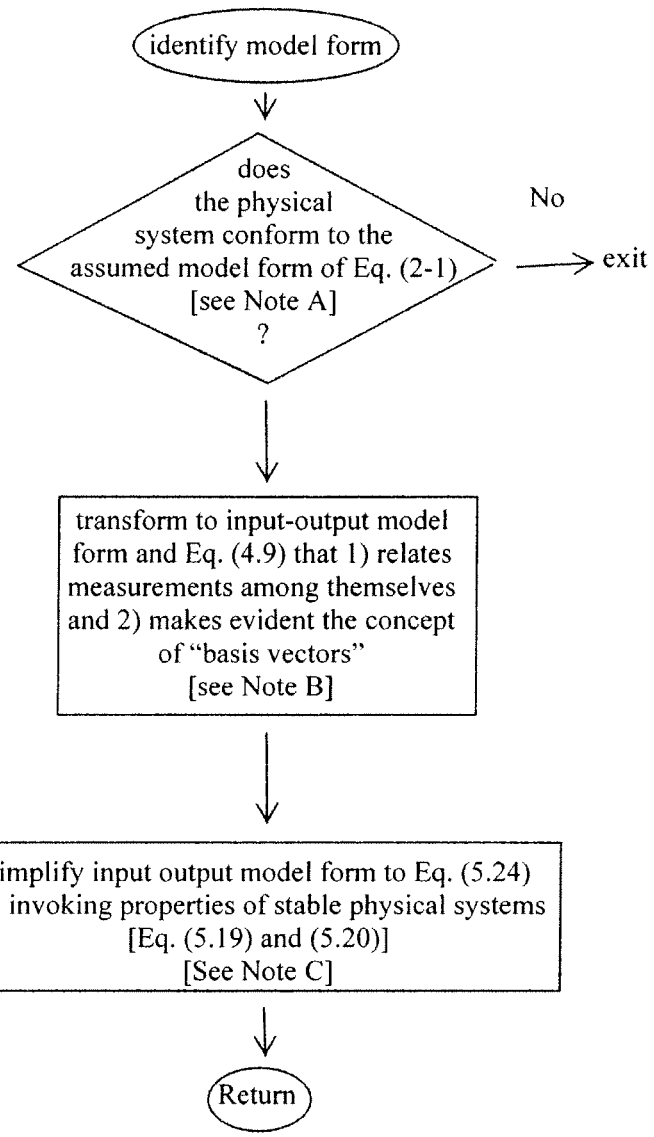
FIG. 1(a)(ii)

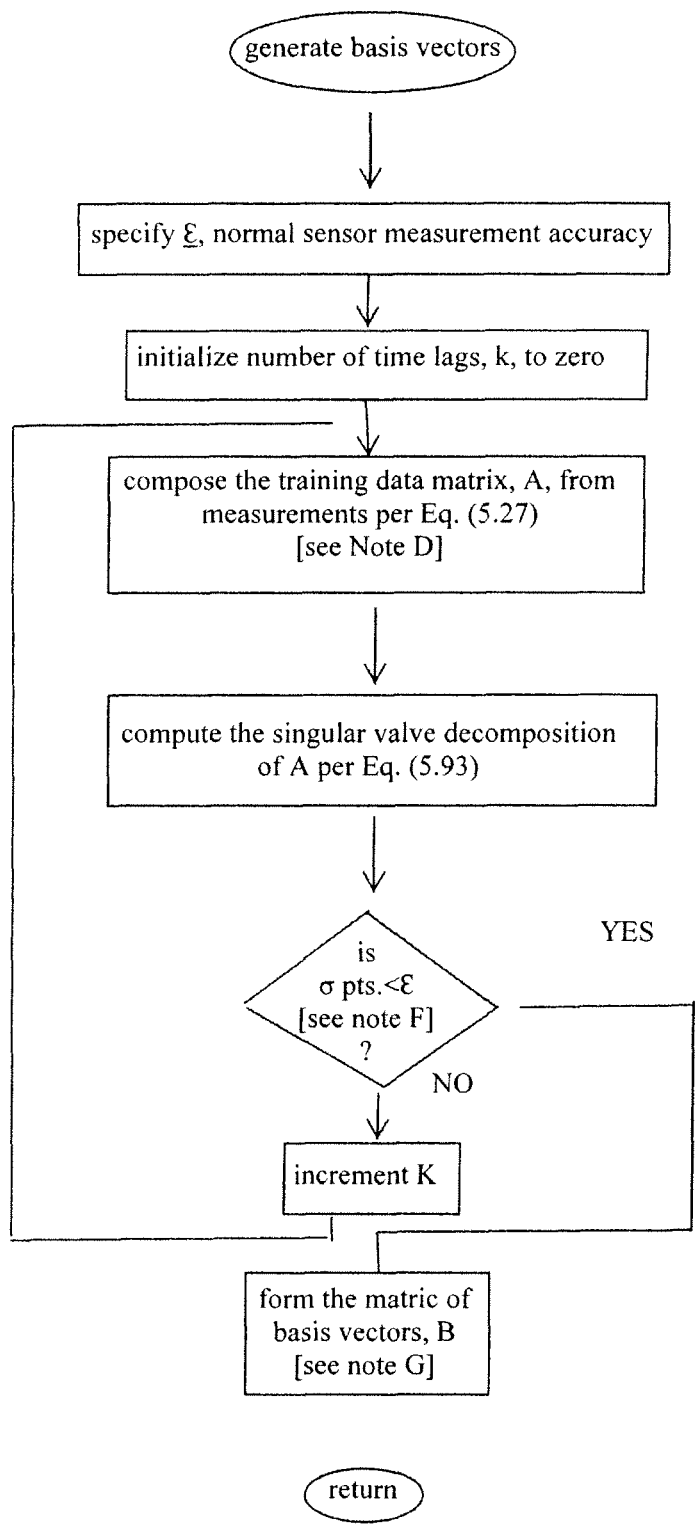
FIG. 1(a)(iii)

FIG. 1(a)(iv)
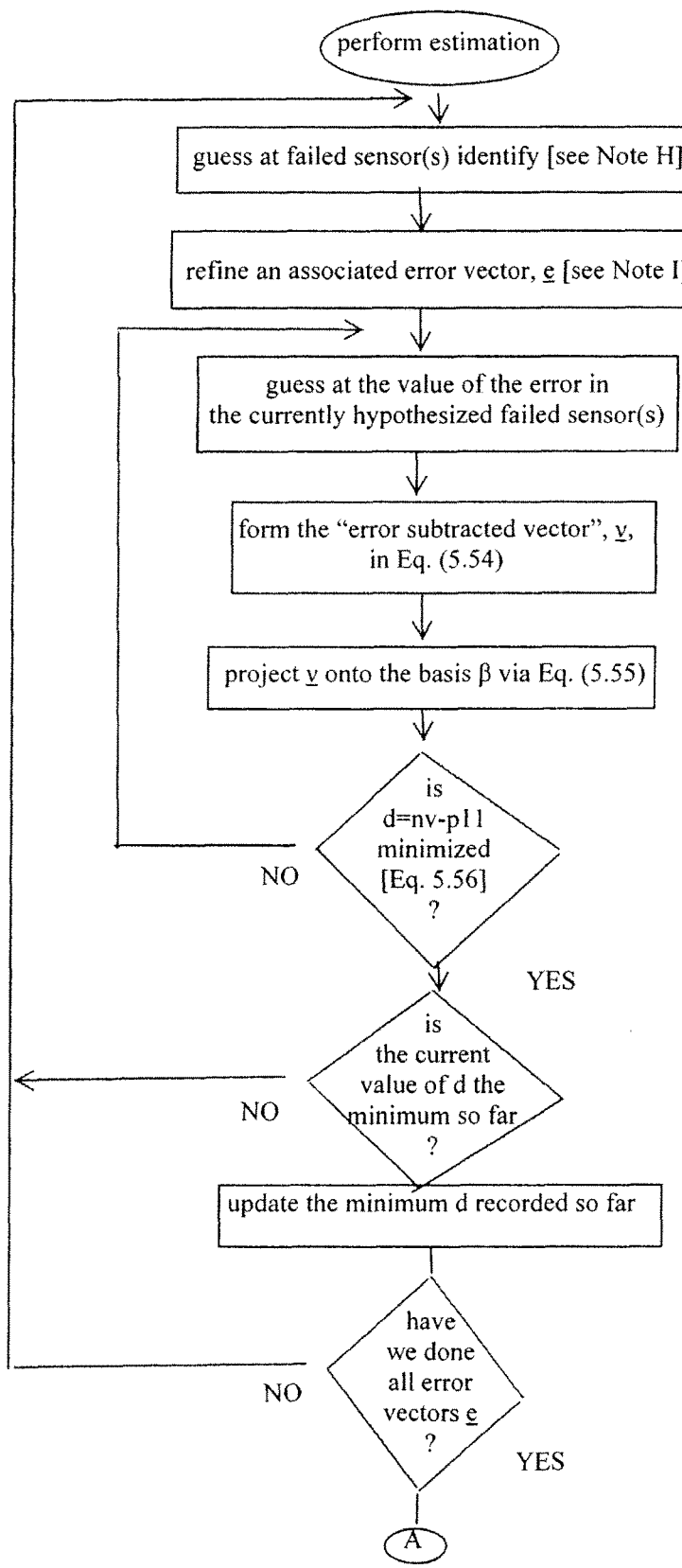

Generate Basis Vectors

Load Training Data

Basis Vector Settings

Select Variables to Include

Selected Input Variables:
- Flowout_DUMMY
- Flowout_DUMMY

Selected Output Variables:
- Tout_DUMMY
- Tout_DUMMY
- Tout_CVCSregHX
- Tout_CVCScold Note: user-specified sample rate will be applied to both training and monitoring data
Sampling Rate: 10 samples/sec
Total No. of Samples: 10921
Use 1 sample out of every 1 samples Enter Noise Threshold: 0.37559

Enter Maximum Lags: 100

Number of clusters to use: 1

Auto-generate # of clusters?
◉ Yes
○ No

Graph cluster convergence?
○ Yes
◉ No

Create models with # of clusters from 1 to 1

Create Basis Vectors

View Training Results  Save Training Results

FIG. 5

Generate Monitoring Results

Load Basis Vectors  Load Monitoring Data

Monitoring Settings

Start Time:
End Time:
Total span of data values: ____ secs
Data sampling rate: ____ samples/secs User-specified sampling rate:
1 sample out of every 1 samples
Net number of samples available:

Start with sample number: 1
End with sample number: 1

Generate Results

View Results  Save Results

FIG. 6

View Monitoring Results

Select Results

Send all variables to Matlab workspace

Monitoring Results Name: 2013_07_31_gpass30_BVgpass50.mat

Monitoring Data Name: gpass 30% flow decrease tube and shell.o

View Basis Vectors | Basis Vectors Name: 2013_07_31_gpass50_10clusters_0L.mat

Starting Time Sample #: 1
Ending Time Sample #: 1201
# of Time Samples Used: 1201

Graph Variables

Difference Between Monitored Data and Estimated Data

|   | Flowout_DUMMY | Tout_CVCSregHX | Tout_CVCScold | Associated Cluster |
|---|---|---|---|---|
| 0 | 0 | 0 | 0 | 1 |
| 1 | 0 | 0 | 0 | 1 |
| 2 | 0 | 0 | 0 | 1 |
| 3 | 0 | 0 | 0 | 1 |
| 4 | 0 | 0 | 0 | 1 |
| 5 | 0 | 0 | 0 | 1 |

FIG. 7

Select Variables to Graph

Available Variables

Selected Variables

Flowout_DUMMY
Tout_CVCSregHX
Tout_CVCScold

>> Add Variable >>

<< Remove Variable <<

>> Add All >>

<< Remove All <<

Graph Selected Variables

FIG. 8

FIG. 11(a)
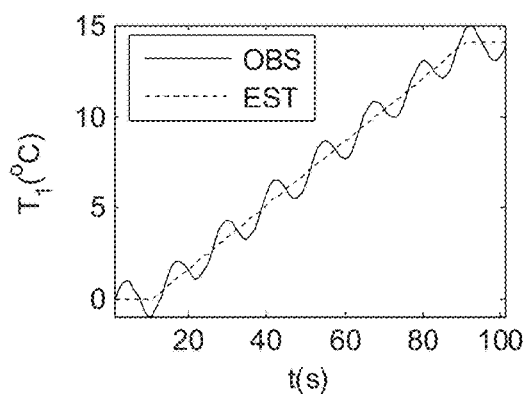
FIG. 11(b)
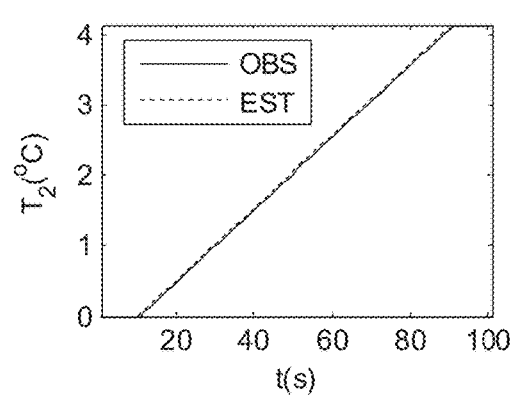
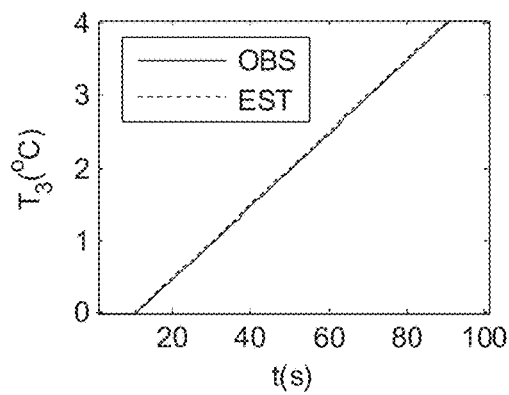
FIG. 11(c)
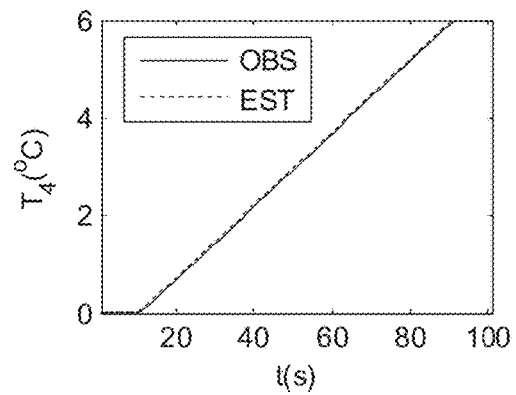
FIG. 11(d)

FIG. 12(a)                FIG. 12(b)
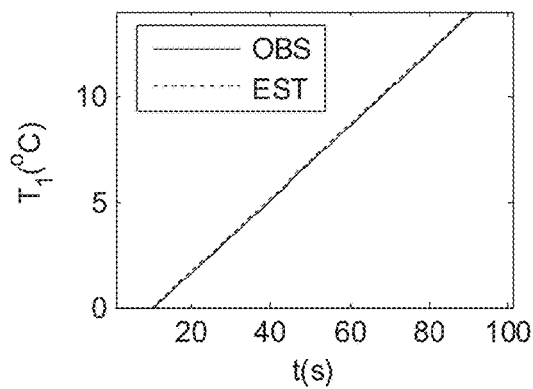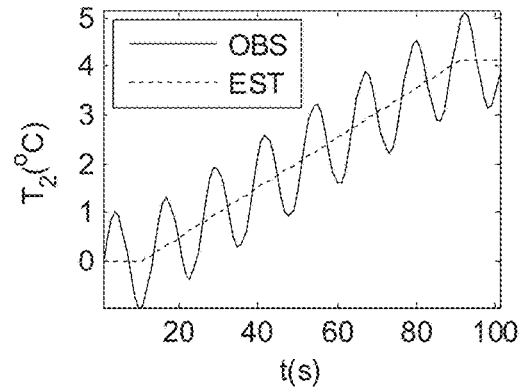
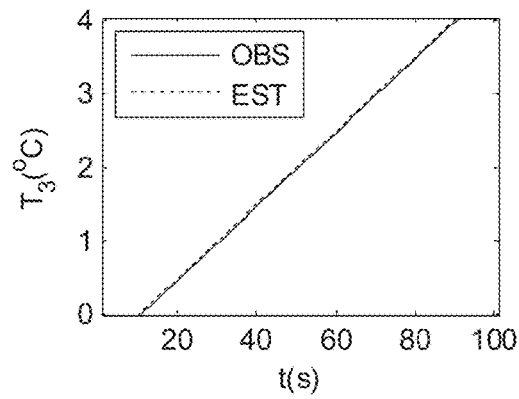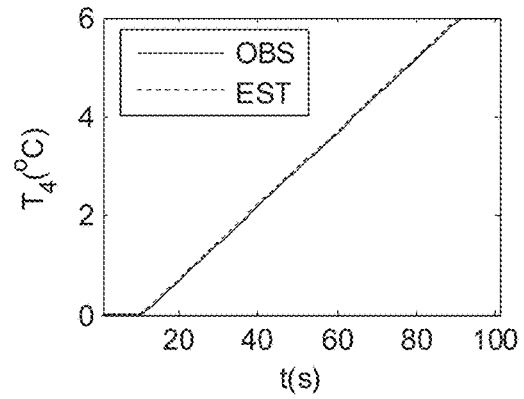
FIG. 12(c)                FIG. 12(d)

FIG. 22(a)
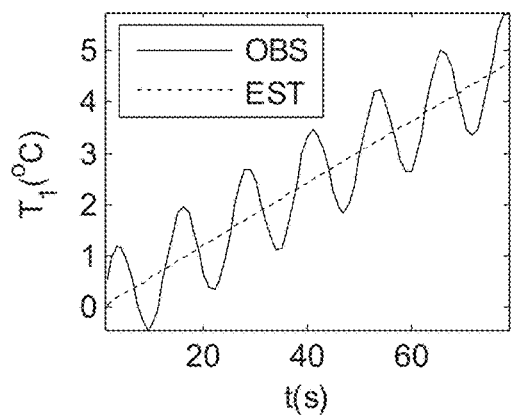
FIG. 22(b)
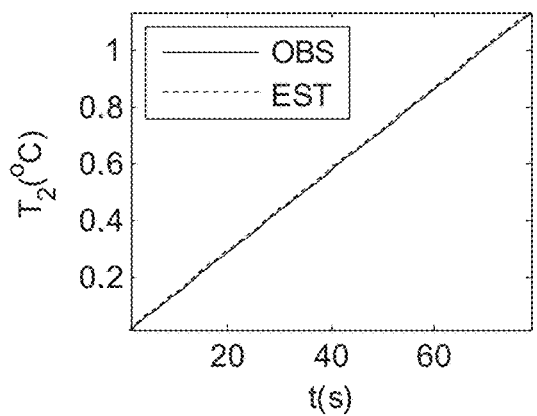
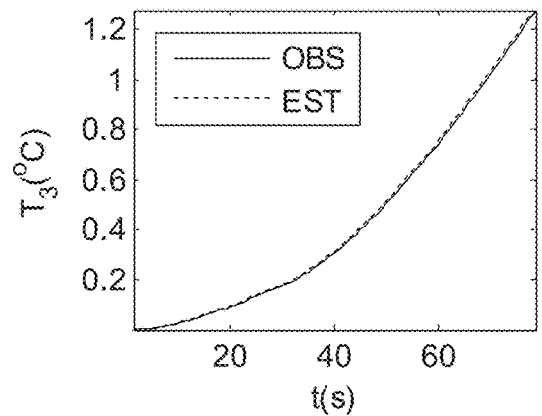
FIG. 22(c)
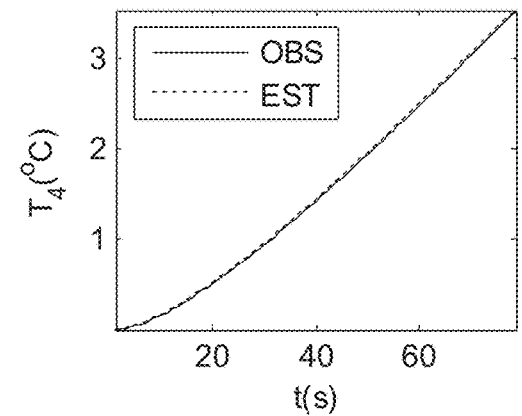
FIG. 22(d)

TRANSIENT MULTIVARIABLE SENSOR EVALUATION

STATEMENT OF GOVERNMENT INTEREST

The United States Government has certain rights in the invention pursuant to Contract No. W-31-109-ENG-38 between the U.S. Department of Energy and the University of Chicago operating Argonne National Laboratory.

FIELD OF THE INVENTION

The present invention relates generally to sensor evaluations for failure analysis and quality control. More particularly, the invention relates to sensor degradation control systems including performing comprehensive tests by simulations of methods and procedures for detecting sensor degradation.

BACKGROUND OF THE INVENTION

Improving manufacturing plant performance through the use of advanced digital technologies imposes stringent requirements on the quality of sensor data. Validated sensor data is a prerequisite for any method which seeks to improve operator awareness of plant conditions, such as thermal state and equipment condition. The dominant problem among the different data-driven sensor validation methods that presently exist relates to the high-false alarm rate. The origin of false alarms include the inability of many methods to perform extrapolation, the inability of many methods to operate with data where plant dynamics have been excited or otherwise perturbed and the absence of guidelines for how the measurement vector should be composed or what is an appropriate set of training data to ensure the physical behavior of the system is adequately captured. These root causes of false alarms are in need of improvement.

One particularly important example of a commercial plant operation which requires rigid and thorough performance is a nuclear power plant which requires accurate and reliable indications of process variable values to operate at peak performance and under safe conditions. Achieving maximum availability, power output, and safety requires a high degree of confidence that the outputs from sensors accurately represent the underlying physical process-variable values. A faulty reading can lead to inappropriate operator actions that can result in either unnecessary thermal cycling of equipment or inadvertent actuation of safety systems. The extreme operating conditions that sensors operate in can, however, result in structural deterioration of a sensor with time, eventually causing the measurement to become unreliable. From the standpoint of safe and efficient operation, there is a need to detect failing sensors so that maintenance can be performed and the quality of sensors readings assured to provide the desired peak performance and safe operating conditions.

The trend toward advanced operator aids places even more stringent requirements on sensor viability and reliability. Situational awareness algorithms for improving operator perception of the plant condition for better managing operation will require validated sensor readings as will semi-automated fault recovery procedures. Sensor values will need to be tested for correctness and shown to satisfy a criterion for acceptability, possibly quantified with a maximum permissible error.

Current industry practice for detecting failing sensors is ad hoc, time consuming, and presents a significant mental challenge to the operator. The operator must scan thousands of sensor readings and correlate these with his own mental model for the underlying physical processes. There is a need to automate sensor validation and to do it more reliably than is achievable by an operator.

Sensor degradation manifests itself as a de-calibration or response time deterioration of the sensor output signal. The early literature on sensor aging identified environmental stress factors giving rise to age-related changes. Heat, humidity, vibration, temperature cycling, and mechanical shock are important drivers of age-related change for resistance temperature detectors ("RTD"). Over time these environmental variables can induce changes in the resistance of insulation, oxidation of the sensing element from long-term exposure at high temperatures, and ingress of moisture. These changes in material properties give rise to the observed sensor aging-related changes. More recently sensor degradation has come to be regarded as a materials problem. From the point of view of materials science, environmental driving potentials can cause atoms to diffuse across material interfaces, cracks and porosity to develop in the bulk, and individual atoms to transmute.

The origin of the false alarms can also include inability of many algorithms to perform extrapolation, inability of many algorithms to operate with data where plant dynamics have been excited, and absence of guidelines for how the measurement vector should be composed or for what is an appropriate set of training data to ensure the physical behavior of the system is adequately captured. It is therefore important to develop a capability that addresses the above root causes of false alarms and is able to detect sensor degradation and correct the sensor output until such time as the sensor can be either re-calibrated or replaced, such as during a planned shutdown. The latter point further recognizes that sensors are not readily accessible for maintenance during operation and is another problem source demanding an improved system and method for providing solutions to the various problems set forth hereinbefore.

SUMMARY OF THE INVENTION

Various embodiments of the present invention relate to systems and methods for improving sensor performance for various commercial sensor applications, including but not limited to quality control, failure analysis, sensor degradation and failure and dynamic analysis of sensor and system status. The method and system further include, for example, 1) designing a sensor to minimize the effects of degradation and 2) on-line analytically correcting sensor output signal for degradation-caused faults using knowledge of the physical processes so as to obtain an "adjusted" sensor output. One embodiment for the on-line correction of sensor value can be an intra-sensor derived adjustment, obtained at the individual sensor level using a material physics-based model. Another embodiment for on-line correction of sensor value can be an inter-sensor derived adjustment, obtained at the ensemble level (i.e. among a collection of sensors) using physically-based correlations, which relate outputs of sensors connected through a network of thermal-hydraulic circuits. In the former case, a material-based model can predict sensor degradation as a function of the sensor's environment. In the latter case, physically-based correlations among sensors derived using either data-driven or first principles methods can be used to predict this correction.

The shortcomings of existing methods and system described hereinbefore are treated herein by considering the case of the Multivariate State Estimation Technique (MSET), a well known methodology that has seen great commercial success. To date MSET has generated sales in excess of $100 million. The MSET method is found in the oil and gas industries, aerospace industries, and the electric power generation industries. Yet, based on open literature descriptions of the methods of MSET, the method does not address the issues of extrapolation, dynamic data, and basis for composing the measurement vector.

An inspection of the methods of MSET suggests that the absence of consideration for the properties of the equations that describe the physical systems monitored accounts for the absence of a direct treatment of extrapolation and dynamic data.

The present invention by contrast begins with a representation of the conservation laws for the physical system written. This includes use of a set of ordinary-differential equations and includes representation of the actuators that drive the system and sensors that are used to observe it. This methodology does not need to be known in detail, but an understanding of its general structure is needed for developing a robust data-driven model. Conditions that the training data must satisfy are identified to ensure a reliable and robust data-driven model. Sensor fault detection and identification is based on computing the residual-error vector. The correct error vector is found as the residual, which produces the best fit of the error-free estimate of the observation to the column space of model basis vectors. The residual, which localizes errors to the "bad" sensors, is found by a search in the space of all possible error vectors.

BRIEF DESCRIPTION OF THE PREFERRED EMBODIMENTS

FIGS. 1(a)(i)-1(a)(v) illustrate a flow chart of a preferred embodiment of the invention; FIG. 1(b) shows a computer based system for carrying out the methods of the invention;

FIG. 5 shows a window for generation for basis vectors from training data;

FIG. 6 shows a window for performing estimation using user specified monitoring data;

FIG. 7 shows a window showing parameter values prior to viewing estimation results;

FIG. 8 shows a window for selection of variables to be plotted with respect to observed and estimated values;

Figure 13:
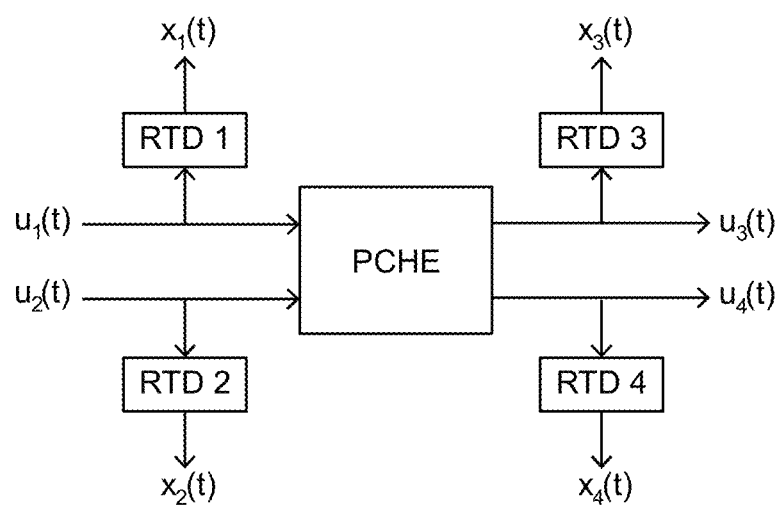
Figure 14A:
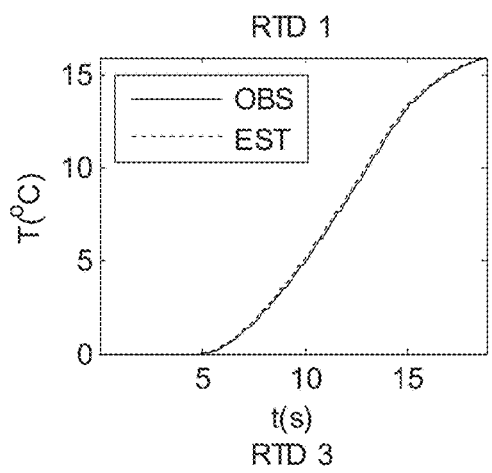
Figure 14B:
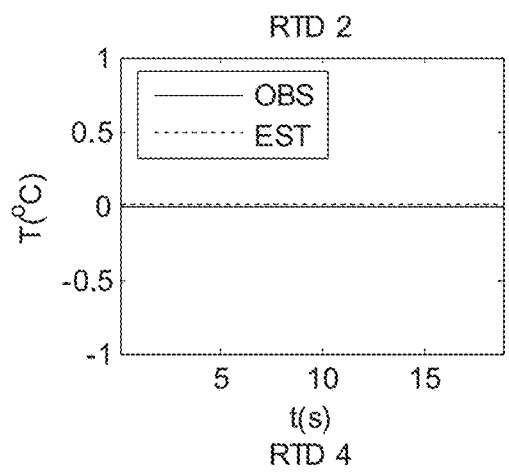
Figure 14C:
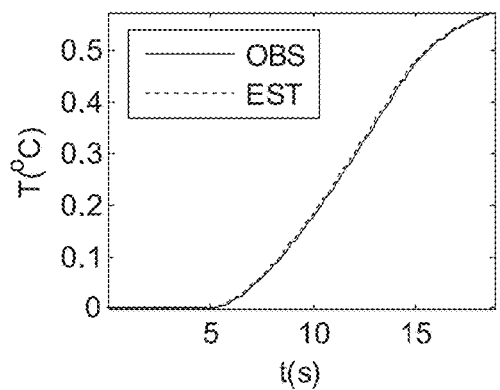
Figure 14D:
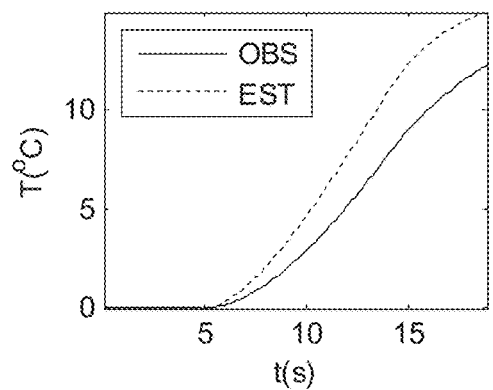
Figure 15A:
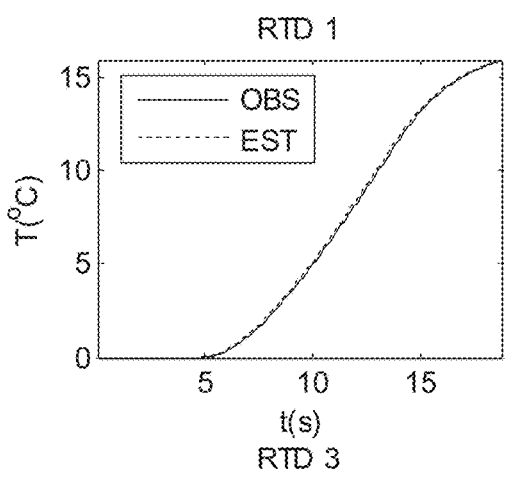
Figure 15B:
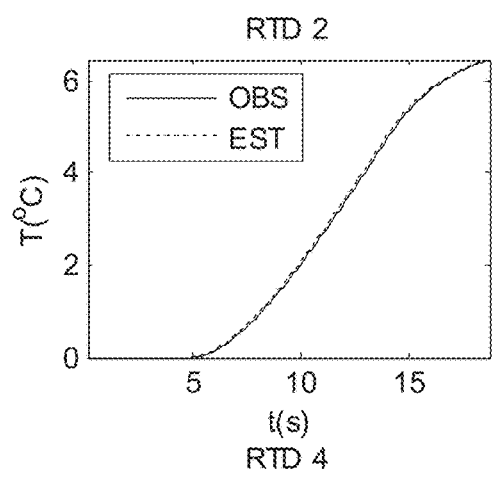
Figure 15C:
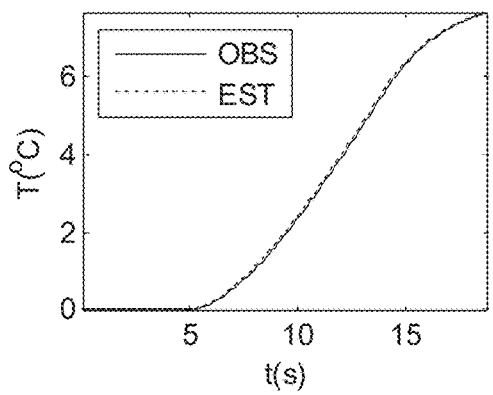
Figure 15D:
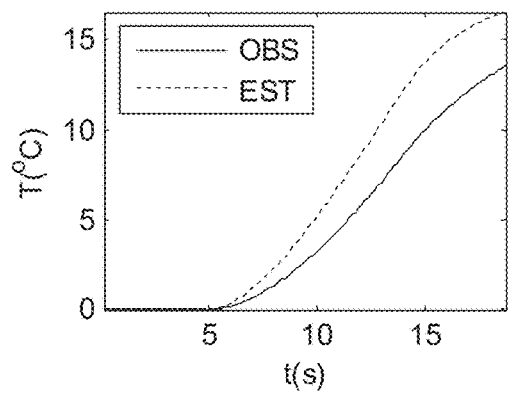
Figure 16A:
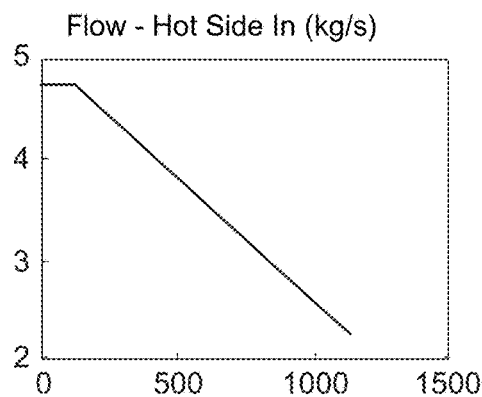
Figure 16B:
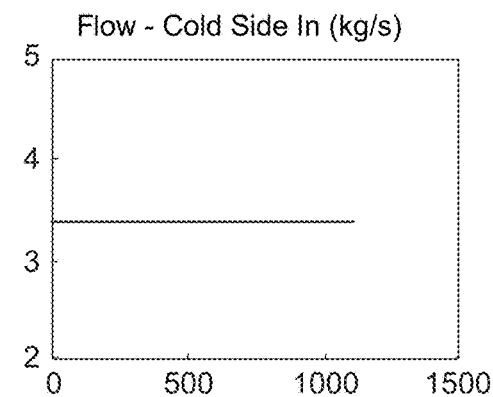
Figure 16C:
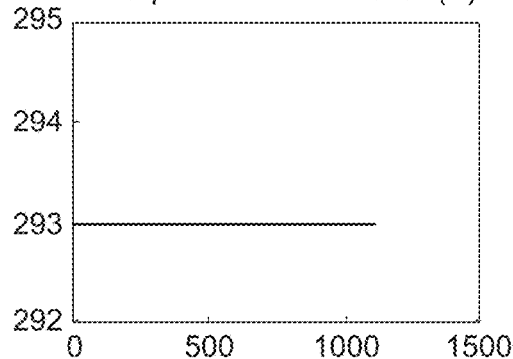
Figure 16D:
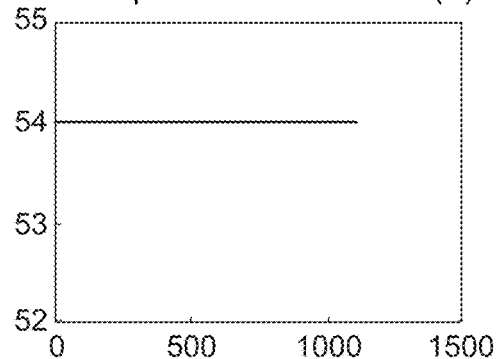
Figure 16E:
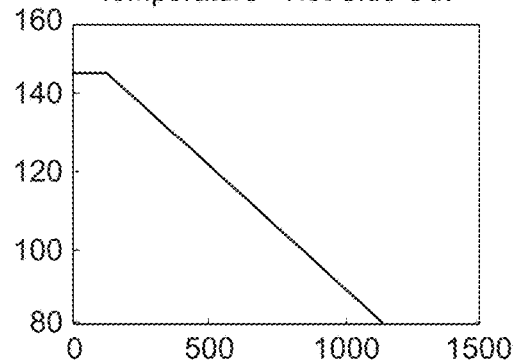
Figure 16F:
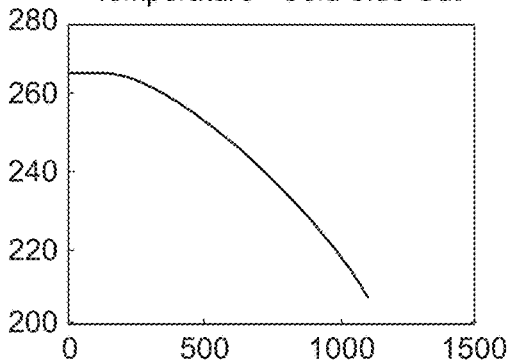

FIGS. 9(a)-9(d) show detection of fault in failed first RTD sensor;

FIGS. 10(a)-10(d) show detection of fault in failed fourth RTD sensor;

FIGS. 11(a)-11(d) show detection and identification of fault in the first sensor of linear quasi-static system;

FIGS. 12(a)-12(d) show detection and identification of fault in the second sensor of linear quasi-static system;

FIG. 13 shows a schematic drawing of sensor fault detection in four RTD temperature sensors connected to input and output of PCHE;

FIGS. 14(a)-14(d) show fault detection in failed fourth RTD sensor among RTD's monitoring linear quasi-static PCHE with one active input;

FIGS. 15(a)-15(d) show fault detection of failed fourth RTD sensor among RTD's monitoring linear quasi-static PCHE with two active inputs;

FIGS. 16(a)-16(f) show training transient for quasi-static non-linear heat exchanger.

Figure 17:
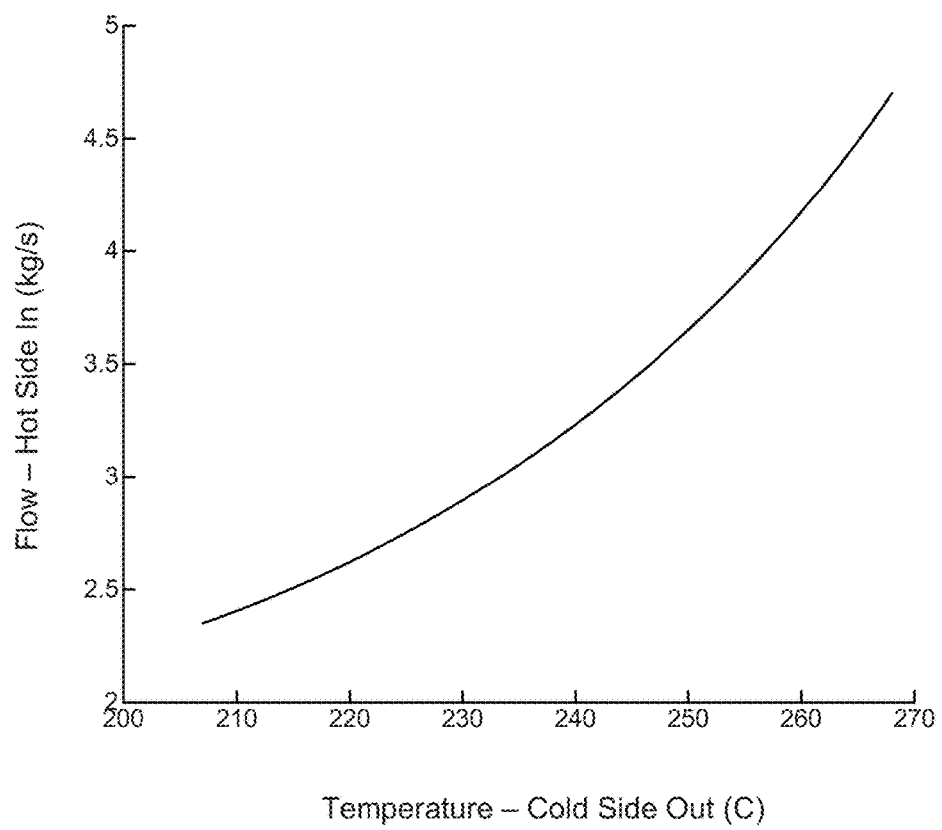
Figure 18A:
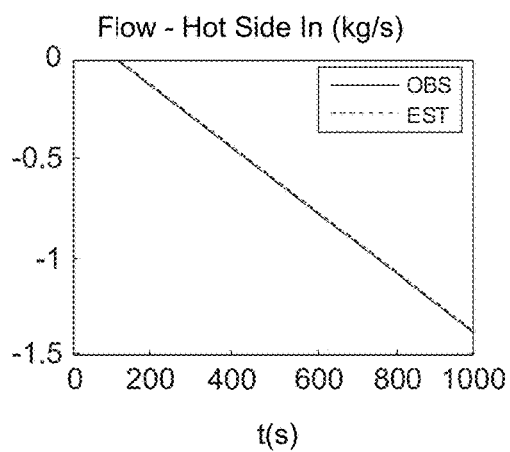
Figure 18B:
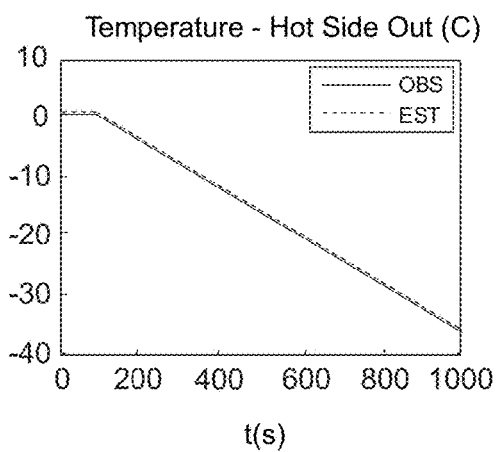
Figure 18C:
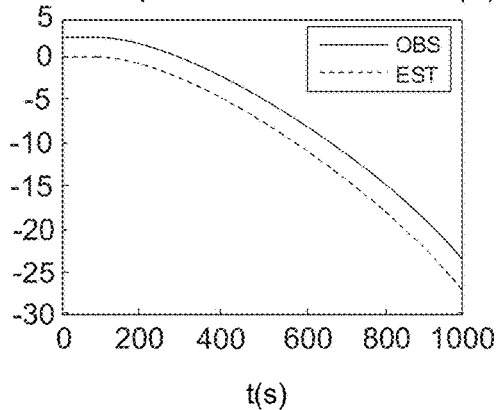
Figure 18D:
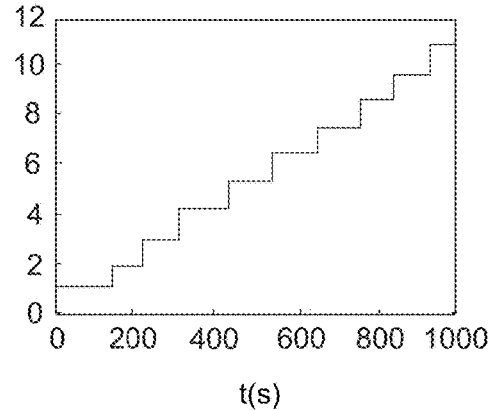
Figure 19A:
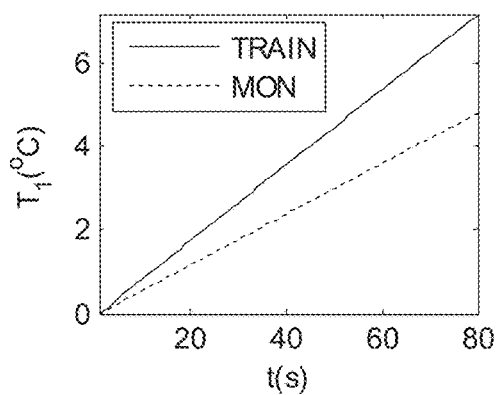
Figure 19B:
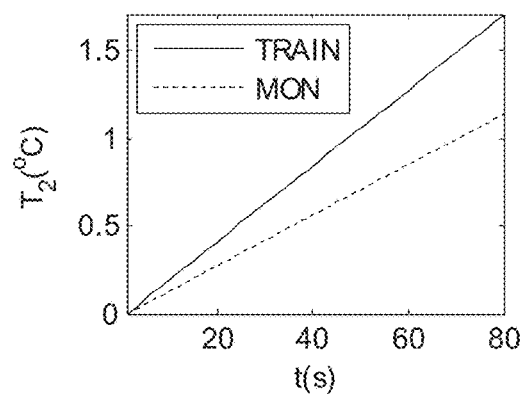
Figure 19C:
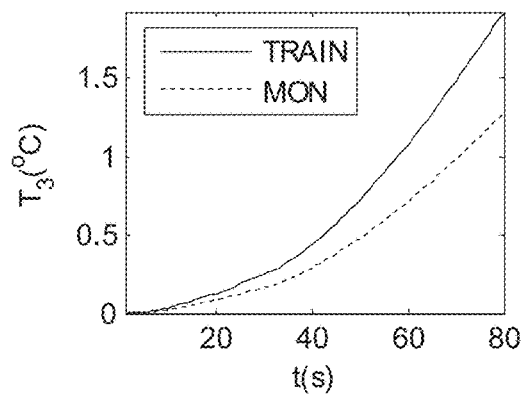
Figure 19D:
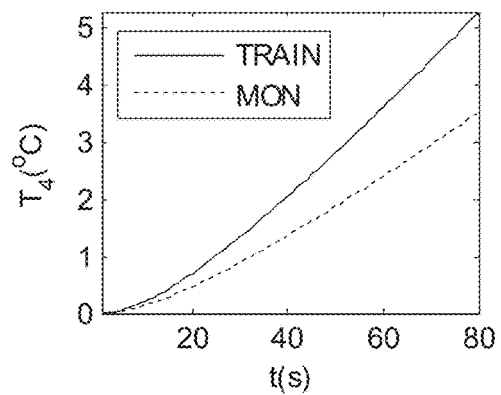
Figure 20:
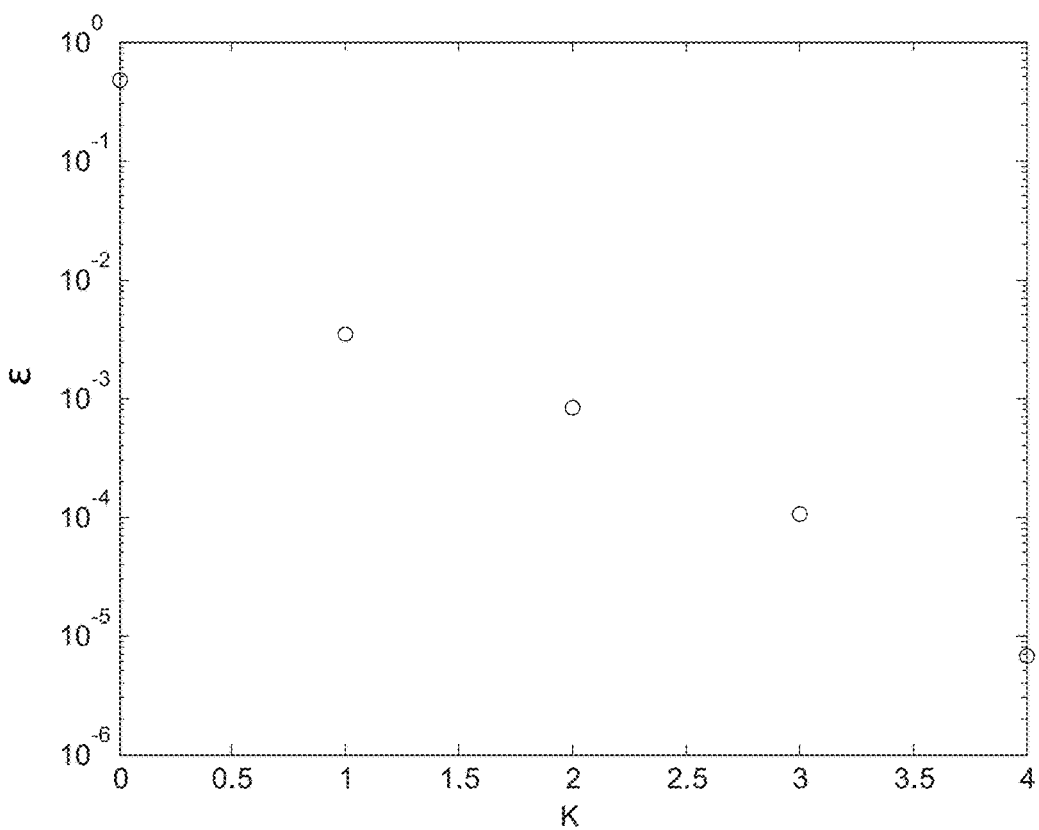
Figure 21A:
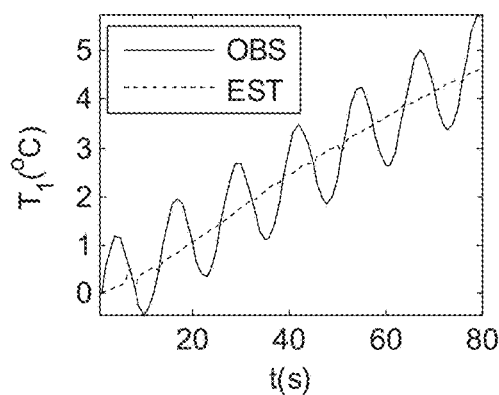
Figure 21B:
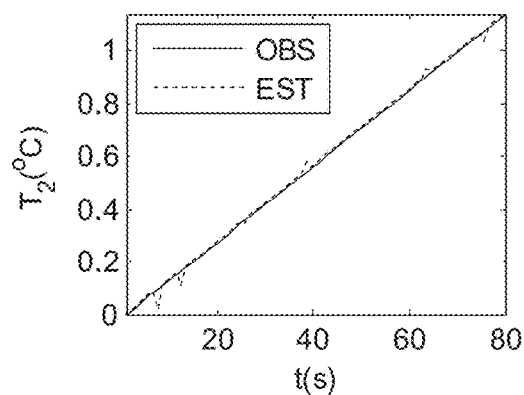
Figure 21C:
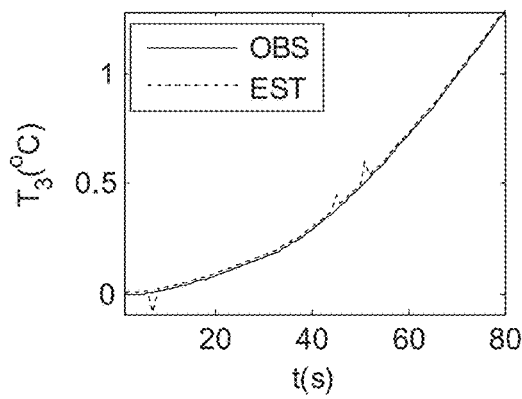
Figure 21D:
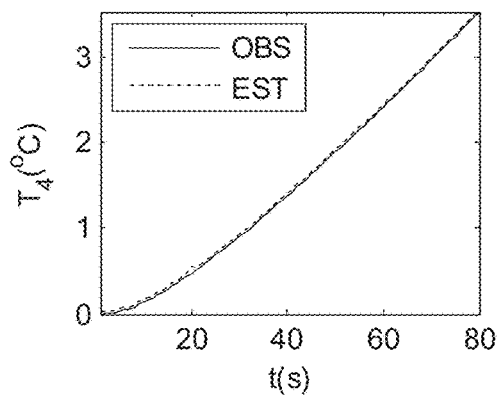
Figure 23:
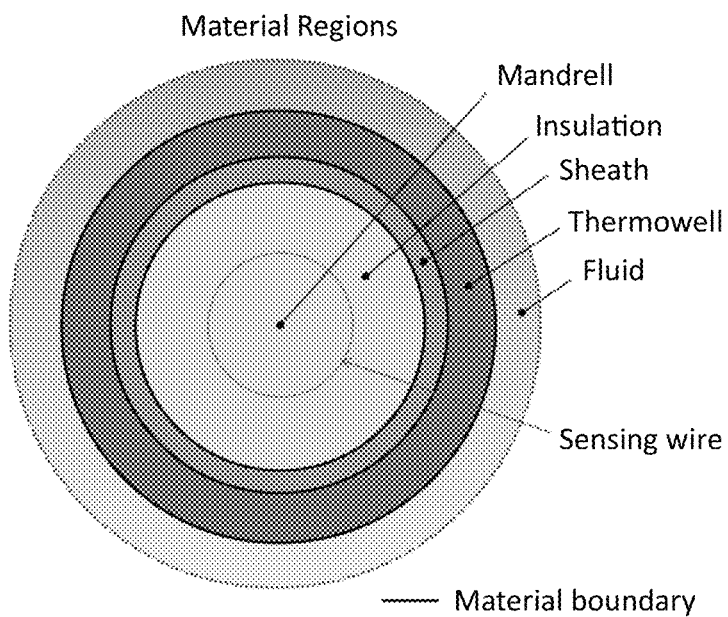
Figure 24:
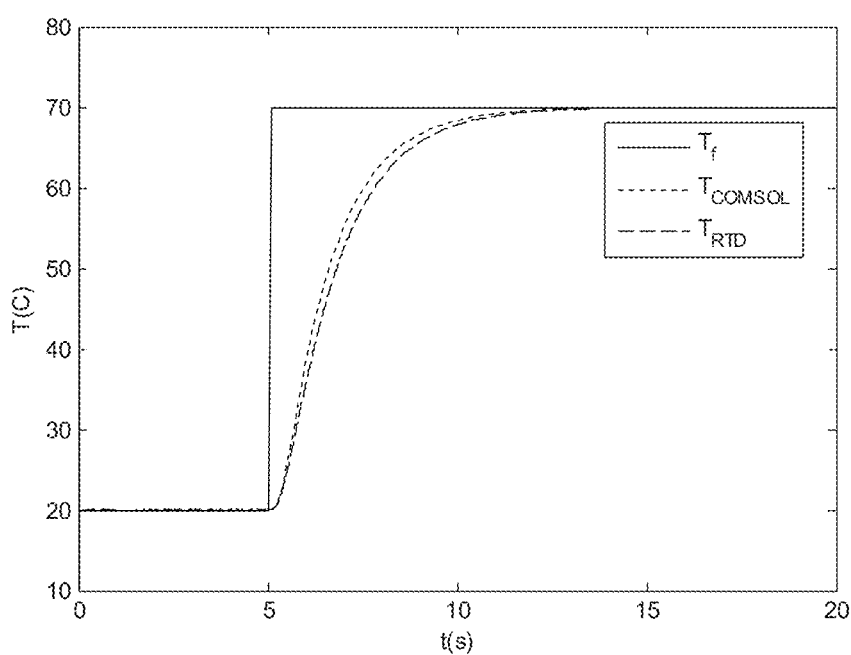
Figure 25:
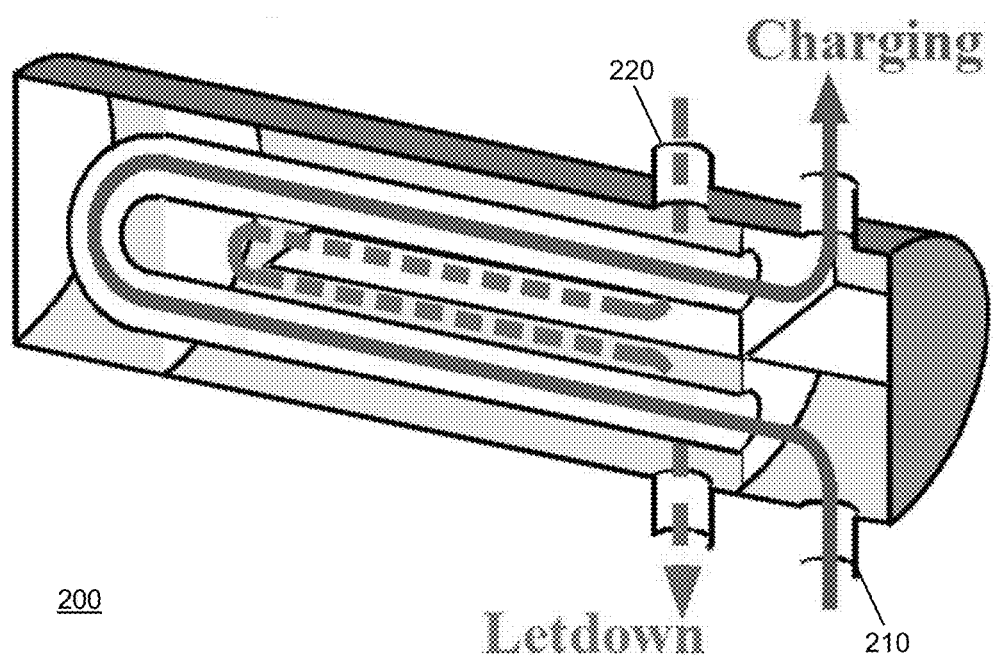

FIG. 17 shows a system non-linearity as exhibited by trend of temperature and versus flow rate;

FIGS. 18(a)-18(d) show fault detection of failure cold side outlet temperature sensor for heat changer operation over non-linear regime;

FIGS. 19(a)-19(d) show training and monitoring transients;

FIG. 20 shows plot of error as a function of the number of time delays K;

FIGS. 21(a)-21(d) show detection and correction of fault in the first sensor with K=0 time delays;

FIGS. 22(a)-22(d) show detection and correction of faults in the first sensor with K=1 time delays of the inputs $T_1$ and $T_2$;

FIG. 23 shows a schematic drawing of transverse cross-section of well-type RTD;

FIG. 24 shows fluid temperature $T_\rho$ and Responses of RTD calculated using 3-D COMSOL model $T_{COMSOL}$ and 1-D five-node FEM model $T_{RTD}$ as functions of time;

FIG. 25 shows a sketch of the regenerative heat exchanger; and

Figure 26:
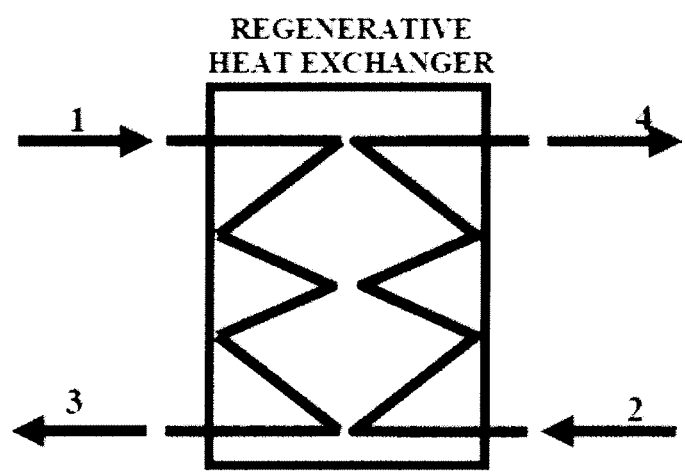

FIG. 26 shows a schematic of the GPASS model of the regenerative heat exchanger.

DETAILED DESCRIPTION OF PREFERRED EMBODIMENTS

In one embodiment of the invention the methodology can be best illustrated by providing a description of a physical system, reviewing past methodologies, provide example implementations and test data which will illustrate the solutions to the problems of the prior art.

Figure 1A:
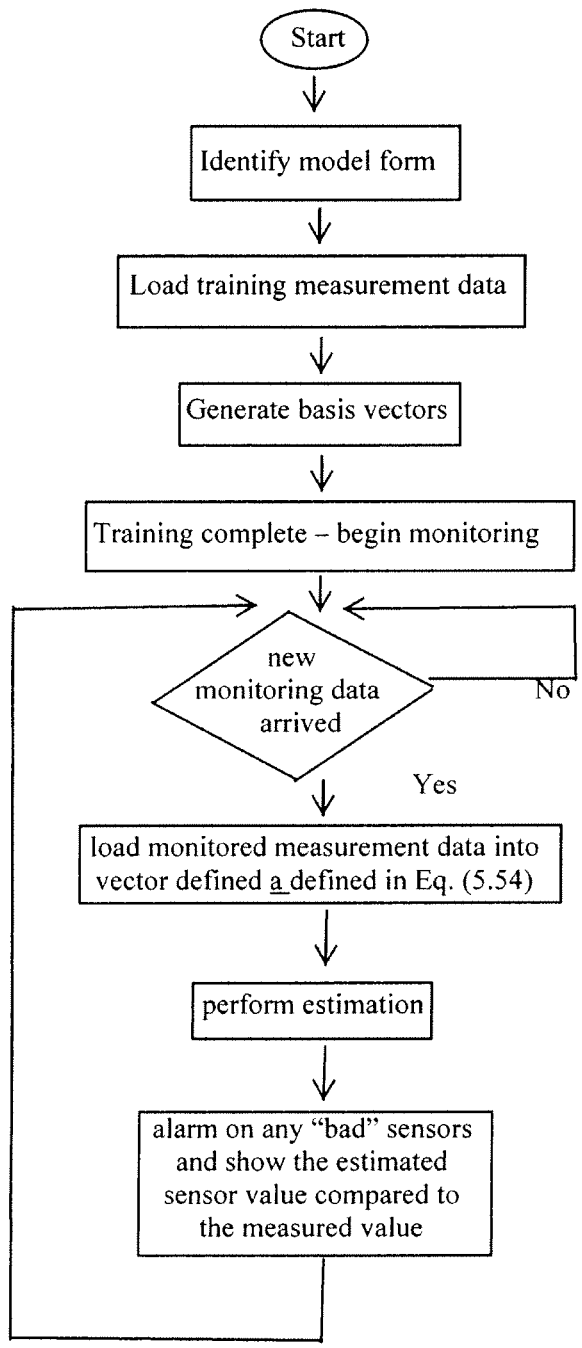
Figure 1A:
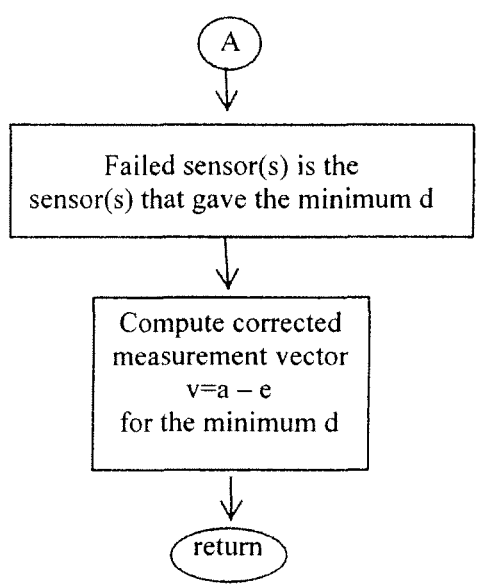

In one preferred embodiment of the invention, the method and system includes the illustrated systems and processes shown in FIG. 1(a). These systems can be controlled, and processes implemented by use of a system 100 and accompanying components shown in FIG. 1(b).

Figure 1B:
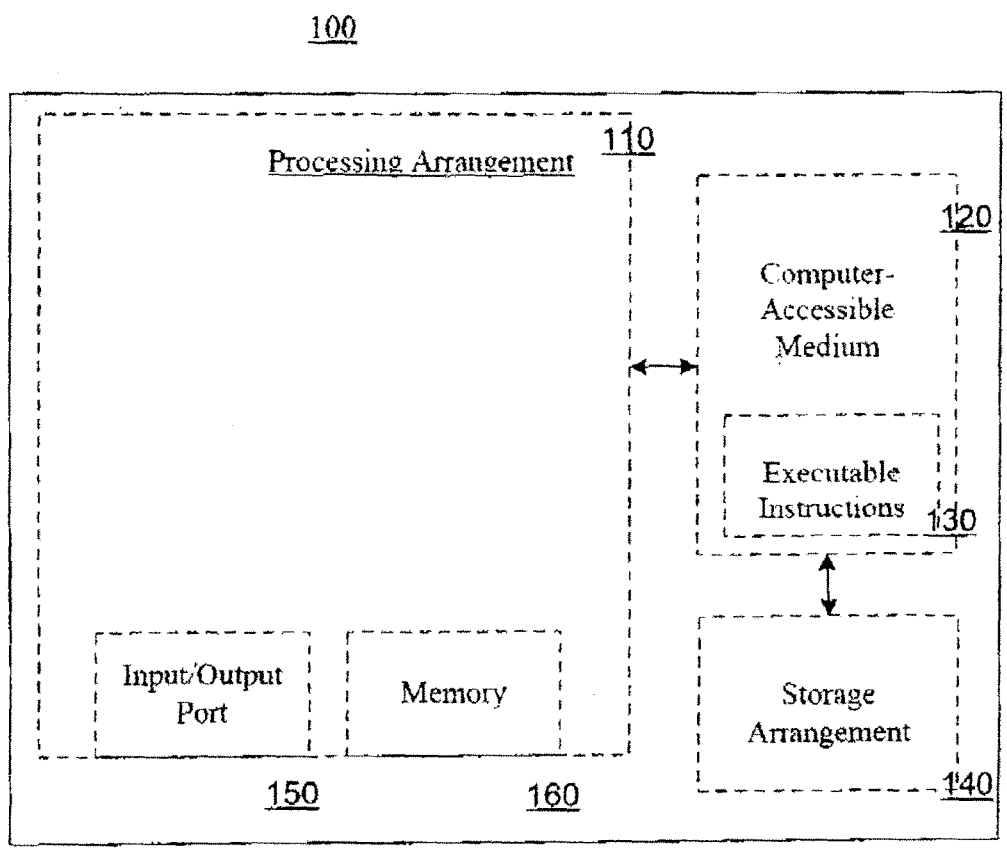

As shown in FIG. 1(b), e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Sensor validation algorithms operate on measured data acquired from physical systems. It follows that to understand the properties of a particular algorithm or to develop new algorithms with desired properties one must have a mathematical representation of the physical system.

Most engineered systems typically consist of some collection of physical plant, sensors, actuators, and control systems, each of which can usually be described by ordinary differential equations. In the present case, the physical system whose identification and representation here is a necessary element of an improvement invention is represented by $$\frac{d}{dt}x(t) = f_c(x(t), u(t)) \quad (2\text{-}1)$$

and $$y(t) = g(x(t), u(t)) \quad (2\text{-}2)$$

where
$x(t) = n*p \times 1$ state vector,
$u(t) = r \times 1$ input vector,
$y(t) = p \times 1$ output vector.

This model is transformed into a time-discretized form so that input and output variables with the sampled data plant data acquisition system which performs measurement and control functions at periodic points in time. The input vector u can change value only at discrete times $t_k$ where $k=0, 1, 2, \ldots$ and $t_{k+1}-t_k=\Delta$. Similarly, the output vector y is measured or sampled only at times $t_k$. Integrating across the sample time interval, $$x_{k+1} = f_d(x_k, u_k) \quad (2.3\text{a})$$

and $$y_k = g(x_k, u_k). \quad (2.3\text{b})$$

Prior art MSET based methods and systems perform on-line sensor fault detection and identification using a data-driven approach. The on-line data-driven approach to sensor fault detection using sensor output data from prior measurements to estimate validity of current measurements in real time. This approach provides advantages compared to either off-line inspection or first-principles physics models. On-line monitoring of sensors offers a timely and cost-effective option for sensor fault detection, as compared to off-line inspection. Although integrity of sensors can be evaluated off-line, this approach does not result in timely detection of sensor failure because inspection has to wait for scheduled process shut-downs. Such shutdowns are scheduled infrequently because of industry loss of revenue during plant down times. Data-driven models of complex manufacturing and process systems, such as a power plant, are more robust compared to first-principle numerical models. Numerical methods based on first-principles physics require complete a-priori model of the industrial process. If the industrial system properties change slightly over time, first-principles models can no longer accurately describe the industrial system. On the other hand, a data driven approach does not rely on the complete a-priori analytical knowledge of the physical system. Instead, the datadriven method learns about the system from prior measurements.

A large number of data-driven methods for sensor fault detection, which include Kalman filtering, neural networks, and state estimation, have been proposed. Since there have been very few benchmarking studies, relative merits of various methods are difficult to assess. In one benchmarking study conducted by the Department of Energy, MSET performance was shown to be far superior compared to that of probabilistic neural network tools of SNL and autoassociative neural network methods of UT. In addition, to the best of our knowledge, a relatively small number of fault detection methods reported in the prior art have been reduced to practice. On the other hand, MSET has been successfully used by a number of industries, including power technology (nuclear, oil, gas) and aerospace.

MSET is derived from a least-squares ("LS") estimation method, which is used primarily to fit analytical model to experimental data. Application of conventional LS method to sensor failure detection is hindered because LS is not capable of identifying sensor fault. Since only a small subset of sensors are expected to fail at any given time, fault identification amounts to localization of the error to the true "bad" sensors. The structure of the LS method is such that it attempts to find the best fit to the observation, and therefore spreads the error across all sensors in the plant. In order to localize sensor error, MSET introduces proprietary methods for warehousing training data in a memory matrix, and finding an estimate for the monitoring data using a non-linear operator. In the MSET approach, an n-by-1 state vector X is formed by recording values of n sensors at the same time. During MSET training phase, an n-by-m memory matrix D $$D = [X_1 X_2 \ldots X_m] \quad (3.1)$$

is obtained from m observations of the state vector taken at different times over the course of plant lifetime. Training vectors are ordered in magnitude from the smallest vector $X_{min}$ to the largest $X_{max}$ using a proprietary vector ordering routine. Next, m uniformly spaced samples are computed to populate the n-by-m memory matrix D. Columns of D represent all "normal" states of the plant, i.e., states corresponding to measurements made when all sensors were "good." During the monitoring phase, one records a new observation of the state vector $X_{obs}$. In general, one can decompose $X_{obs}$ into two orthogonal vectors $$X_{obs} = X_{est} + X_{err} \quad (3.2)$$

where $X_{est}$ is the projection of $X_{obs}$ onto column space of D $$X_{est} = Dw \quad (3.3)$$

and $X_{err}$ is the error vector which appears as the result of failure of one or more sensors. According to the LS theory, the norm of the error vector is minimized by appropriately adjusting the coefficients in the vector of weights w via solution of the equation $$D^T D w = D^T X_{obs} \quad (3.4)$$

so that one can obtain an estimate based on the observation as $$X_{est} = D(D^T D)^{-1} D^T X_{obs}. \quad (3.5)$$

Equations (3.1) through (3.5) were obtained from the LS theory. MSET is derived from LS by replacing matrix multiplication in Equation (3.5) with a nonlinear operator $\otimes$ (defined in the theoretical basis of the well known MSET method), so that $$X_{est} = D \cdot (D^T \otimes D)^{-1} \cdot D^T \otimes X_{obs} \quad (3.6)$$

Contrary to LS, MSET is based on template matching. The assumption of MSET is that if the state of the system has not been observed in the past, it must correspond to a system fault. The nonlinear operator $\otimes$ is introduced for two reasons. The first objective of the MSET nonlinear operator is to facilitate calculation of the inverse matrix in Equation (2.6). The MSET memory matrix D consists of all the prior measurements. In general, such D has linearly dependent columns, so that $D^T D$ is not invertible. However, as shown in the theoretical basis of MSET, the matrix $D^T \otimes D$ is invertible. The second objective of the nonlinear operator $\otimes$ is to obtain a scaled vector of weights w with entries distributed between 0 and 1. That is, MSET attempts to find w in which one element is maximized (as close to 1 as possible), while the rest of the elements are minimized (as close to 0 as possible). The largest element in w indicates the likelihood that the observed state $X_{obs}$ was seen during MSET training. The nonlinear operator finds a column vector in the memory matrix D which matches the observation $X_{obs}$ most closely. Any differences between the entries of $X_{obs}$ and $X_{est}$ vectors indicate failure of the corresponding sensors, thus localizing the error.

There are a number of shortcomings of MSET. Any sensor has a finite response time, which is the time that elapses between the onset of the change in the ambient medium and generation of the corresponding sensor output signal. Pressure and flow measurement sensors are known to have response times that are smaller than, while temperature sensors are known to have response times larger than typical fluid transient time scale. Thus pressure and flow meters can be modeled as zero-order systems, while temperature sensors are modeled as dynamic first-order systems. Early signs of dynamic sensor physical degradation manifest themselves in slower sensor response, or increase in the time constant. Performance of zero-order sensors can be monitored using steady-state observations. On the other hand, monitoring of first-order sensors requires transient observations.

MSET monitoring is based on matching an observation to the column vectors of memory matrix D, which contains a finite range of state vectors limited in magnitude from below and above by $X_{min}$ and $X_{max}$ respectively. According to MSET logic, any observation vector $X_{obs}$ (including a "normal" one with none of the sensors failing), which is not in the range between $X_{min}$ and $X_{max}$, must correspond to sensor fault. During transient observations, one is likely to be presented with an observation which is outside of the range of MSET memory. Thus, inability to extrapolate causes MSET to fail during transient monitoring, and therefore precludes MSET from detecting fault in first-order sensors. In addition, either during transient or steady-state observations, noise may cause the observation to fall outside of the range in MSET memory. This may result in MSET producing a false alarm during either transient or steady-state observations. Therefore, inability of MSET to generalize to observations outside the range of MSET memory causes the method to fail in monitoring both zero-order and first-order sensors.

MSET operates by comparing a new measurement against the existing database, and has no capacity to generalize. Therefore, MSET accuracy depends entirely on the content of the training data. In general, the larger the size of the training data, the more accurate MSET performance would be. The size of the data which can be used for MSET training, aside from the obvious limited volume of recorded data, is also limited by sensor's lifetimes. That is, NPP data recorded over a timespan larger than the sensor's lifetime may contain readings from failed sensors. The implicit assumption in MSET is that the state vector of NPP sensors has only a finite number of "normal" states. That is, all normal "normal" states of the NPP cooling system can be learned from a reasonably small amount of training data. This assumption might be justified if MSET is to be used for monitoring of steady state observations. During normal NPP operation, temperature, pressure and flow rate of the cooling fluid do not change frequently. Thus, it is very likely that all "normal" steady states of the state vector can be learned from several years-worth of training data. On the other hand, transitions between steady states can occur via a variety of transients. In general, the plant is seldom at steady state since it is either purposefully undergoing a normal operational transient or undergoing an unexpected upset transient. Even when the plant is nominally at steady state, control system dead band may result in small transients as controlled variables alternately drift between dead band limits. In order to learn all possible transients of NPP cooling system, MSET may need to be trained on an excessively large database of prior measurements. Even if such database becomes available, this places a computational burden of inverting the memory matrix consisting of possibly millions of elements.

An MSET template matching approach is inadequate for estimation of monitoring transients. The solution to unknown transient estimation is to use the basis vectors of the system, and adopt a framework which allows forming linear combinations of basis vectors. MSET has been shown to produce correct estimation of the transient if the memory matrix D is populated with pre-computed linear combinations of the basis vectors of the training transient. The deficiency of this method is that it requires generating exhaustive databases of training vectors and inverting very large matrices. Therefore, using MSET in the basis vectors mode becomes computationally infeasible.

Theoretical Basis of Method

In view of the importance of the basic MSET method and system, a new data-driven Algorithm for Transient Multi-variable Sensor Estimation (AFTR-MSET) is developed to address the limitations of existing methods and systems described hereinbefore. The approach of the present invention starts with a representation of the conservation laws for the physical system as described hereinbefore. This model provides a guide to the mathematical structure needed for performing sensor estimation. Conditions that the training data must satisfy are derived to ensure a reliable and robust data-driven model. This model provides a basis for performing state estimation and for detecting failing sensors.

The new estimation method and system include the following properties:

Ability to perform sensor measurement estimation during transients when a limited number of sensors has failed or degraded.

Ability to extrapolate during sensor measurement estimation thereby solving the false alarm problem associated with newly-arrived normal operation data that is outside the range of already learned data.

Specifies the necessary conditions for determining whether the data-driven model has properly captured causality as it exists between the inputs that drive a physical system and the outputs of the system as observed through a sensor set.

Ability to treat non-linearities that exceed the capabilities of a single data-driven model.

In order to carry out the method and system of the invention, one begins by identifying the mathematical form to represent the physical system and that underlies the development of methods and systems. Then the conditions are derived that the training data must satisfy to ensure a reliable estimation capability serving as a basis for performing state estimation and for detecting failing sensors. It also makes evident how the reliability of a data-driven approach is inherently limited when it is obtained without regard to the properties of the physical system.

The new method and system is derived for the case where the physical system of Eq. (2.1) is assumed to be a linear time-invariant (LTI) set of ordinary differential equations (ODE). When the physical system is non-linear, a set of LTI ODES valid about a set of contiguous operating points is assumed to provide a good approximation to the more general Eq. (2.1).

Linearization—The linearized-discrete form of Eq. (2.3) is $$\delta x_{k+1} = \Phi_k \delta x_k + \theta_k \delta u_k \quad (4.1)$$

and $$\delta y_k = C_k \delta x_k + D_k \delta u_k$$

where $$\Phi_k(i,j) = \frac{\partial f_d(i)}{\partial x(j)}\bigg|_k \quad \theta_k(i,j) = \frac{\partial f_d(i)}{\partial u(j)}\bigg|_k$$

$$C_k(i,j) = \frac{\partial g(i)}{\partial x(j)}\bigg|_k \quad D_k(i,j) = \frac{\partial g(i)}{\partial u(j)}\bigg|_k$$

where the partial derivatives are evaluated at $u^0$ and $x^0$, and where $$\delta x_k = x_k - x^0$$

$$\delta u_k = u_k - u^0$$

$$\delta y_k = y_k - y^0 \quad (4.2)$$

Typically, $u^0$ and $x^0$ are chosen be to a quiescent point about which the system operates.

Canonical Form—Under very weak conditions (as well understood by one of skill in the art), the linearized discrete system of Eq. (4.1) can be transformed into canonical observable form $$\delta x_{k+1} = \begin{bmatrix} -A_1 & I & 0 & \cdots & 0 \\ -A_2 & 0 & I & \cdots & 0 \\ \vdots & & & \ddots & I \\ -A_n & 0 & & \cdots & 0 \end{bmatrix} \delta x_k + \begin{bmatrix} \tilde{C}_1 \\ \tilde{C}_2 \\ \vdots \\ \tilde{C}_n \end{bmatrix} \delta u_k \quad (4.3)$$

$$\delta y_k = [I \ 0 \ \cdots \ 0] \delta x_k + C_0 \delta u_k$$

where $\delta x_k$ is composed of subvectors, $\delta x_{k,i}$, i=1, ... n, each of dimension p×1, $$\delta x_k^T = [\delta x_{k,1}^T \delta x_{k,2}^T \cdots \delta x_{k,n}^T]$$

and where $A_1, \ldots A_n$ are p×p matrices and $C_0, \tilde{C}_1, \ldots \tilde{C}_n$ are p×r matrices.

Input-Output Form—The canonical form has an alternate representation know as the auto-regressive moving average (ARMA) form. Both equations have the same input-output response. The ARMA form is $$\delta y_k + A_1 \delta y_{k-1} + \ldots + A_n \delta y_{k-n} = C_0 \delta u_k + \ldots + C_n \delta u_{k-n} \quad (4.4)$$

or $$E \delta Z_k = 0 \quad (4.5)$$

where $$E = [I \ A_1 \ A_2 \ \cdots \ A_n \ -C_0 \ -C_1 \ \cdots -C_n]. \quad (4.6)$$

and $$\delta Z_k = \begin{bmatrix} \delta y_k \\ \delta y_{k-1} \\ \vdots \\ \delta y_{k-n} \\ \delta u_k \\ \delta u_{k-1} \\ \vdots \\ \delta u_{k-n} \end{bmatrix} \quad (4.7)$$

Thus, the values of the inputs and outputs of the system taken over n successive sample times satisfy Eq. (4.4). The vector $\delta Z_k$ is referred to as a measurement vector.

Transformation between the state space form of Eq. (4.1) and the ARMA form of Eq. (4.4) is given by $$\tilde{C}_i = C_i - A_i C_o \quad (4.8)$$

and $$\delta x_{0-1} = -A_1 \delta y_{k-1} - \ldots - A_n \delta y_{k-1} + C_1 \delta u_{k-2} + \ldots + C_n \delta u_{k-n}$$

$$\delta x_{0-2} = -A_2 \delta y_{k-1} - \ldots - A_n \delta y_{k-n+1} + C_2 \delta u_{k-1} + \ldots + C_n \delta u_{k-n+1}$$

$$\vdots$$

$$\delta x_{0-n} = -A_n \delta y_{k-1} + C_n \delta u_{k-1}$$

Necessary conditions that the measurement vectors must satisfy are derived and these conditions provide guidance on how to assemble the vector.

Basis Vectors—It is clear that the set of all possible measurement vectors $\delta Z_k$ of the linear discrete system of Eq. (4.5) occupy the null space of the matrix E. In turn the null space of E, denoted by N(E), is spanned by a set of basis vectors P. One such basis is a subset of measurement vectors. In turn all other measurement vectors can be written as a linear combination of these basis vectors. This property is important in a preferred embodiment to the extrapolation property of the estimator developed below.

Causality—Eq. (4.4) is written as $$[A \quad -C]\begin{bmatrix}\delta Y \\ \delta U\end{bmatrix} = 0 \quad (4.9)$$

where $A = [I \quad A_1 \quad A_2 \quad \ldots \quad A_n] \quad C = [C_0 \quad C_1 \quad \ldots \quad C_n].$ and $$\delta Y = \begin{bmatrix}\delta y_k \\ \delta y_{k-1} \\ \vdots \\ \delta y_{k-n}\end{bmatrix} \quad \delta U = \begin{bmatrix}\delta u_k \\ \delta u_{k-1} \\ \vdots \\ \delta u_{k-n}\end{bmatrix}$$

A requirement of the memory matrix is that it reflects the coupling between system inputs and outputs. For a sensor to be included in the measurement vector the system must be with respect to the process variable either input controllable or output observable.

Input Controllable—First, the $\delta U$ vector must contain only elements that affect the system outputs. An element that does not will convey no meaningful information about the system in the sense that its value has no effect on the behavior of the system. To determine if all the elements of $\delta U$ influence the outputs write using Eq. (4.9) as above $$[\delta Y_1 \delta Y_2 \ldots \delta Y_{K-n}]^T [C_L^{-1} A]^T = [\delta U_1 \delta U_2 \ldots \delta U_{K-n}]^T \quad (4.10)$$

where again the subscript L denotes the left pseudo inverse. All elements of $\delta U$ influence the values of $\delta Y$ only if and only the solution $[C_L^{-1} A]$ exists (i.e. can be solved for). Then all the elements of $\delta U$ must be dependent on $\delta Y$, i.e. affect the values of $\delta Y$.

Output Observable—Second, the $\delta Y$ vector must contain only elements that are driven by system inputs. An element that is not connected to the inputs does not contain meaningful information about the behavior of the system in the sense that its value exists independent of the conditions that are forcing the system. To determine if all the elements of $\delta Y$ have a dependence on the system inputs, write using Eq. (4.9), $$[\delta Y_1 \delta Y_2 \ldots \delta Y_K] = A_L^{-1} C [\delta U_1 \delta U_2 \ldots \delta U_{K-n}] \quad (4.11)$$

where L denotes the left pseudo inverse and where for the collection of $[\delta U_i, \delta Y_i]$, i=1, . . . , K−n in the training set, i=time index, K=number of sample times, and n=order of the number of differential equations needed to describe the system, All elements of $\delta Y$ depend on $\delta U$ if and only if for, $$[\delta U_1 \delta U_2 \ldots \delta U_{K-n}]^T [A_L^{-1} C]^T = [\delta Y_1 \delta Y_2 \ldots \delta Y_{K-n}]^T \quad (4.12)$$

the solution $[A_L^{-1} C]^T$ exists (i.e. can be solved for).

Identifiability—The degree to which a dataset of measured data [U,Y] represent the system can be assessed by rewriting Eq. (4.9) as, $$\begin{bmatrix}\delta Y \\ \delta U\end{bmatrix}^T [A \quad -C]^T = 0 \quad (4.13)$$

and solving for A and C. Then the y(k) obtained by substituting these values into Eq. (4.4), and forcing this system with the U, can be used to form a residual between the y(k) and the corresponding elements of Y. The size of this residual is an indication of how identifiable the system is with respect to the measured [U,Y]. Strictly this should be evaluated using a leave-one-out protocol where [U,Y] contain multiple transients and are portioned as such.

Sensor estimates obtained using linearized representations of the system are referred to as point estimates. These estimates are local to the point of linearization.

Generalization—The dynamic case represented by Eq. (4.4) has the solution given by Eq. (4.5). Again, if $\alpha_k$ is a free parameter, then a particular solution satisfies, $$\alpha_k E \delta Z_k = 0. \quad (4.14)$$

By analog with the development in Section x, an observation vector can then be written as $$\delta Z_{est} = MW \quad (4.15)$$

Where, $M = [\delta Z_1 \delta Z_2 \ldots \delta Z_s]$ and $W = [\alpha_1 \alpha_2 \ldots \alpha_s]^T$ and measurement vectors $\delta Z_k$, k=1, 2, . . . , s span the solution space of Eq. (4.15).

Least Squares Estimator—If a matrix M of observation vectors has been assembled and a new observation vector $\delta Z_{obs}$ arrives, then the least-squares estimate for $\delta Z_{obs}$ is given by, $$\|\delta Z_{obs} - \delta Z_{est}\| = \|\delta Z_{obs} - MW\|. \quad (4.16)$$

wherein, $$\delta Z_{est} = M[M^T M]^{-1} M^T \delta Z_{obs}$$

The least-squares estimate has the property that it is the vector in the space spanned by M that is closest in the Euclidean sense to the observed vector.

With this background, if the columns of M span the null space of E, then let a set of basis vectors for these measurement vectors be stored as the columns of the m-by-n matrix A. A measured vector $\delta Z_{obs}$ with possible errors in its elements can be decomposed into orthogonal vectors as, $$\delta Z_{obs} = p + \xi \quad (4.17)$$

where p is the projection of $\delta Z_{obs}$ onto column space of A and $\xi$ is the error vector, so that, $$p \in C(A) \text{ and } \xi \perp C(A) \quad (4.18)$$

According to the least squares development, $$p = P \delta Z_{obs}, \quad P = A(A^T A)^{-1} A^T \quad (4.19)$$

so that the "closest" true system state to measurement vector $\delta Z_{obs}$ is p where P is defined as the projection operator.

$L_0$-Norm Estimator—In the case of a degraded sensor, the "error" in the observation vector is isolated to a single element of $\delta Z_{obs}$. Or in the case where the initial degraded sensor is not replaced before a second or third sensor degrades, then the error in the observation vector is limited to a small subset of elements. The goal is to use the remaining good sensor values to reconstruct values for the degraded sensors. Least squares can potentially return an improved estimate for the actual state, but it has no mechanism for righting only the degraded values. Rather, it provides the estimate that lies in the space of A that is closest to the observed vector. This estimate lacks the desired feature, that only the elements in error are corrected. Elements that are in fact good are perturbed in the process of finding the estimate closest to the observed vector.

An appropriate estimator should have the property that the estimate lies in R(A). Thus, if p is the estimate, then $$\delta Z_{obs} = p = \xi = Ax + \xi \quad (4.20)$$

In the case of the $i^{th}$ element of the measurement vector, then $$\xi_i = (\delta Z_{obs})_i - (Ax)_i \quad (4.21)$$

will be zero for a good sensor and non-zero for a failed sensor.

The estimator should also have the property that the number of its elements that deviate from the observed vector over all possible vectors in R(A) is a minimum. That is, it should penalize assigning deviation to sensors that are good. While in general the number and identity of the faulted sensors is unknown, the fraction of sensors failed will be small increasing the likelihood that there is redundancy in the remaining sensors to allow for prediction of the failed values. Thus, one should look for an estimator that will allow for a deviation between measured and estimated value for the failed sensors and no deviation for the good sensors. An estimator with these characteristics is the minimum $L_0$-norm of the residuals, $$\min_x \|\xi\|_0 = \min_x \|\xi_1\|_0 + \|\xi_2\|_0 + \ldots + \|\xi_m\|_0. \quad (4.22)$$

This estimator has the property that only failed sensors will tend to have estimates that deviate from the measured value. Alternative representations are $$\min_x \|(\delta Z_{obs})_i - (Ax)_i\|_0, \, i = 1, \ldots, m \quad (4.23)$$

and $$\min_x \|\delta Z_{obs} - Ax\|_0. \quad (4.24)$$

Algorithm for $L_0$-Norm Estimate—In practice, there is no direct solution to the above minimum $L_0$-norm. But the problem can be transformed into a least-squares problem where a hypothesized subset of failed sensors is evaluated with respect to a minimum norm and then compared to all other such subsets or permutations. The subset that gives the global minimum of all such norms yields the estimate of Eq. (4.24).

To proceed, suppose I is a set of integers whose values correspond to the identity of a subset of the m sensors. Let J be the complement of I. Define an m×m matrix selection operator such that for an m×1 vector w, $$(S(I)w)_i = w_i, \, i \in I$$

$$(S(J)w)_j = 0, \, j \in J. \quad (4.25)$$

That is, S(I) operates on w to zero out all elements not contained in I.

Define $x_{min}(I)$ as the linear combination x of the columns of A for which $$\min_x \|S(I)(Z_{obs} - Ax)\|_2 \quad (4.26)$$

subject to $|S(J)(Z_{obs} - Ax)| < \xi_x$.

where $\xi_x$ is a bound related to the error introduced by using the column space of A to represent a larger subspace spanned by the non-linear system. The constraint when met precludes any "bad" sensors appearing in J. That is, they must appear in I. The particular I that contains bad sensors and only bad sensors is then given by, $$\min_I (\|S(I)(Z_{obs} - Ax_{min}(I))\|_0) \quad (4.27)$$

where the I is over all subset combinations of the sensors that satisfy the constraint in Eq. (5-13). Typically only one or two sensors are expected to fail for practical purposes.

The $x_{min}(I)$ that satisfies Eq. (4.26) is found using the Matab least-squares function lsqlin. The constraint in Eq. (4.26) is first transformed into the form expected by Matlab. Let $$v = S(J)(Z_{obs} - Ax) = Fx - d \quad (4.28)$$

where $$F = -S(J)A$$

$$d = -S(J)Z_{obs}$$

$$x = F_L^\dagger (v + d)$$

$$\xi_v = F(\xi_x - d) \quad (4.29)$$

so that the constrain becomes $$|v| < \xi_v$$

where $F_L^\dagger$ is the left inverse of F.

With these definitions the argument of the minimization in Eq. (4.26) becomes $$S(I)(Z_{obs} - Ax) = Dv - c \quad (4.30)$$

where $$D = -S(I)AF_L^\dagger$$

$$c = -S(I)(Z_{obs} - AF_L^\dagger d). \quad (4.31)$$

With these transformations the problem of Eq. (4.26) is recast as $$\min_v \|Dv - c\|_2 \quad (4.32)$$

subject to $|v| < \xi_v$.

The v can be solved for using lsqlin and the solution transformed back to the original coordinate system through $$x = F_L^\dagger (v + d)$$

$$\xi_x = F_L^\dagger (\xi_v + d) \quad (4.33)$$

Typically, only one or two sensors are expected to fail so the range of I can be compatibly limited.

Minimum Number of Good Sensors to Detect Bad Sensors—Of interest are the limits of applicability of the estimator described above. In particular, how many sensors must be "good" in order to be able to detect "bad" sensors and to then estimate their values. If the measurement system has n basis vectors, then a minimum of n+1 good sensors is needed. This creates an over-determined system whereby any additional sensor that is bad cannot be simultaneously expressed as a linear combination of its associated row elements in the n basis vectors of length n+1. This is represented by the measurement system, $$A_{(n+1) \times n} x_{n \times 1} = (\delta Z_{obs})_{(n+1) \times 1} \qquad (4.34)$$

where A has rank n and the system is over determined since there are more equations than unknowns x. This must be the minimum number of sensors since n sensors (i.e. one less) no matter what their values, good or bad, can always be expressed as a linear combination of the n basis vectors.

It is noted that n of the n+1 sensors above must be linearly independent in the sense that the corresponding n rows of A are linearly independent. This is guaranteed since A is composed of n columns of basis vectors, by definition linearly independent. Further, the n+1$^{th}$ sensor cannot be redundant with any of the first n otherwise the n+1 system will not be over determined.

Systems having strong non-linearities over an operating range are treated using a sequence of linear models that piecewise straddle the operating range. The approach for training such a sequence of models is described below.

Extrapolation and Errors—The estimation method of the preceding subsection is able to extrapolate with zero error for the case where the observed measurement vector lies outside the range of the training data and where the linear system represented by the training data is still valid. But most physical systems are non linear and so error is introduced when the estimator extrapolates significantly outside the range of the training data.

However, through an adaptable operating point (formalized below) the error between the training data and the measurement vector that lies outside the training data can be managed. Essentially, as we move away from point of linearization, the measurement vector is not expressible as linear combination of basis vectors that represent the linearization at the operating point. This error needs to be quantitatively included in the process for estimating otherwise the estimation algorithm will attempt erroneously assign this error to sensor degradation.

Cluster Analysis—A procedure for organizing a collection of data-fitted models that each spans a sub-region of a larger non-linear operating region is described. In this approach an operating point sensor vector that corresponds to the $u^0$ and $y^0$ in Eq. (4.2) is defined. In general there will be L such operating points—$u^0, y^0, \ldots, u^{L-1}, y^{L-1}$. A "local" memory matrix is taken to represent the local functional dependence of nearby sensor vectors about the operating point sensor vector. In the aggregate sufficient such vectors must be generated so that the entire operating region is covered by a sufficient number of vectors so as to yield a near continuously-varying representation.

If the modeler can ensure sufficiently uniform and dense coverage by sensor vectors, then the assignment of sensor vectors to an operating region can be automated through the use of cluster analysis. Cluster analysis provides a means of agglomerating sensor measurement vectors by operating region in an automated fashion and in a way that reflects the natural order among the vectors.

The training algorithm based on the above approach is: 1) identify sensors that belong to inputs u and outputs y, and 2) collect sensor measurements corresponding to u and y over the operating range for sampling times k=1, 2, . . . , K and label these data $u_1, u_2, \ldots, u_K$ and $y_1, y_2, \ldots, y_K$.

Form the vectors by, $$[y_{j+n+1}^T y_{j+n}^T \ldots y_{j+1}^T u_{j+n+1}^T u_{j+n}^T \ldots u_{j+1}^T]^T \qquad (4.36)$$

where each vector is of the form of Eq. (4.7), where j= 0, . . . K−(n+1), and where n is of the number of differential equations needed to describe the system.

One then perform a cluster analysis on this collection of K−n vectors. Written explicitly the collection appears as $$[y_{n+1}^T \quad y_n^T \quad \ldots \quad y_1^T \quad u_{n+1}^T u_n^T \ldots u_1^T]^T, \qquad (4.37)$$

$$[y_{n+2}^T \quad y_{n+1}^T \quad \ldots \quad y_2^T \quad u_{n+2}^T u_{n+1}^T, \ldots u_2^T]^T,$$

$$\vdots$$

$$[y_K^T \quad y_{K-1}^T \quad \ldots \quad y_{K-n}^T \quad u_K^T \quad u_{K-1}^T \quad \ldots \quad u_{K-n}^T]^T.$$

Let $C^i(m)$=the $m^{th}$ member of the $i^{th}$ cluster where $m=1, \ldots, n^i$, $n^i$=dim($C^i$), and $k^{i,m}$=the time index of the first element in vector $C^i(m)$ (4.38)

So, for example, if the above K−n vectors formed a single cluster, then for the second vector in the cluster (as listed above), $$C^1(2) = [y_{n+2}^T y_{n+1}^T \ldots y_2^T u_{n+2}^T u_{n+1}^T, \ldots u_2^T]^T,$$

$n^1 = K-n$, and $$k^{1,2} = n+2. \qquad (4.39)$$

For each cluster i,

Select operating point vector $v^i$ by means of an averaging process among cluster i members.

Assemble training vectors from all members of cluster i, $$\qquad (4.40)$$

$C^i(1) - v^i =$ $$[\delta y_{k^{i,1}+n}^{i \, T} \ldots \delta y_{k^{i,1}+1}^{i \, T} \quad \delta y_{k^{i,1}}^{i \, T} \quad \delta u_{k^{i,1}+n}^{i \, T} \ldots \delta u_{k^{i,1}+1}^{i \, T} \quad \delta u_{k^{i,1}}^{i \, T}]^T,$$

$C^i(2) - v^i =$ $$[\delta y_{k^{i,2}+n}^{i \, T} \ldots \delta y_{k^{i,2}+1}^{i \, T} \quad \delta y_{k^{i,2}}^{i \, T} \quad \delta u_{k^{i,2}+n}^{i \, T} \ldots \delta u_{k^{i,2}+1}^{i \, T} \quad \delta u_{k^{i,2}}^{i \, T}]^T,$$

$$\vdots$$

$C^i(m) - v^i =$ $$[\delta y_{k^{i,m}+n}^{i \, T} \ldots \delta y_{k^{i,m}+1}^{i \, T} \quad \delta y_{k^{i,m}}^{i \, T} \quad \delta u_{k^{i,m}+n}^{i \, T} \ldots \delta u_{k^{i,m}+1}^{i \, T} \quad \delta u_{k^{i,m}}^{i \, T}]^T$$

where the training vectors are relative to the operating point.

Check all outputs $\delta y^i$ are excited per Eq. (4.12).

Check all inputs $\delta u^i$ excite system per Eq. (4.10).

Calculate memory matrix $M^i$.

Bridging Between Clusters—With the training data partitioned into a number of clusters, a method is needed to obtain an estimate for a measurement vector that is assumed to lie among the training data. Presently the estimate is generated by finding that cluster that lies closest to the measurement vector using the Euclidean norm. Once this cluster is found, estimation proceeds according to the linear model development where this cluster is assumed to consist of training data about the operating point referred to above as the operating point sensor vector.

In practice the physical system may be constrained to operate along a path that is defined by some combination of inputs. For example in a nuclear plant the plant control system constrains where the plant will operate during normal operation. This space is relatively small compared to that resulting from all the values the inputs might take if not constrained by normal operating procedures. In the interest of limiting the dimensionality of the estimation process then it is important to characterize the normal operating regime. For the paths normally taken, it is important to note how many independent variables, q, are needed to parameterize this path. While the path is determined by the inputs u, it is usually the case that the individual elements are constrained by the control system such that q<dim(u).

For example, in an ascension protocol to attain a desired power in a nuclear plant the path traced by u can be parameterized in terms of a single variable, power. While u may consist of multiple elements such as primary and secondary mass flow rate and rod position, if the ascension is performed quasi-statically, then all elements of u are specified by the power. If the ascension to power occurs such that dynamics are excited, then the individual controllers that deliver the value of u may depart from the quasi-static path but in a manner that can be captured by a linearization about the quasi-static power operating point.

Implementation of the Method as an Algorithm

Implementation of the above described methods and systems can be described, for example, in the context of a thermal hydraulic nuclear system. The state of the process fluid is manipulated using a variety of components. Sensors measuring fluid state parameters (temperature, pressure and flow rate) are typically placed at the inlets and outlets of a component. In general, each component is a nonlinear dynamic system, which can be linearized about the quiescent point using the clustering method. Sensor response can be modeled as either linear first-order or zero-order system, so that sensors can be treated as parts of the linearized component. The boundary conditions of the component (fluid state variables), which are the inputs to the corresponding sensors, are correlated by the laws of conservation of mass, energy and momentum of the fluid transport. Thus, outputs of sensors monitoring a component are correlated as well. Then, outputs of n sensors arranged in an n-by-1 state vector X define a proper subspace S of the n-dimensional space $R^n$. Mathematically, $S \subset R^n$, so there exists a non-empty subspace $F \subset R^n$, which contains vectors with failed sensor values which are not in S. This serves as the basis of linear estimation of sensor fault.

Multiple-Input Multiple-Output Model of Component

Fluid transport in a thermal hydraulic component (e.g. heat exchanger), can be described by a set of nonlinear ordinary differential equations. In the present embodiment, we can consider a linearized dynamic component with m inputs $x_i[n]$ and l outputs $y_j[n]$, where the values of inputs and outputs are measured in discrete time. The variables $x_i[n]$ and $y_j[n]$ designate temperature pressure and flow rate at the inlets and outlets of the component. The component can be mathematically described as a multiple input multiple output (MIMO) system subject to conservation laws. General form of discrete-time MIMO system can be written as a system of l equations $$\sum_{k=0}^{N} a_{1k} y_1[n-k] = \sum_{k=0}^{M_1} b_{11k} x_1[n-k] + \ldots + \sum_{k=0}^{M_m} b_{1mk} x_m[n-k] \quad (5.1)$$

$$\vdots$$

$$\sum_{k=0}^{N} a_{lk} y_l[n-k] = \sum_{k=0}^{M_1} b_{l1k} x_1[n-k] + \ldots + \sum_{k=0}^{M_m} b_{lmk} x_m[n-k]$$

Taking z-transform of Equation (5.1), we obtain $$P_1(z)Y_1(z) = Q_{11}(z)X_1(z) + \ldots + Q_{1m}(z)X_m(z) \quad (5.2)$$

$$\vdots$$

$$P_l(z)Y_l(z) = Q_{l1}(z)X_1(z) + \ldots + Q_{lm}(z)X_m(z).$$

The functions X(z) and x[n] are related by the z-transform defined $$X(z) = \sum_{n=-\infty}^{\infty} x[n] z^{-n}. \quad (5.3)$$

Equations (5.2) can be written as $$Y_1(z) = \frac{Q_{11}(z)}{P_1(z)} X_1(z) + \ldots + \frac{Q_{1m}(z)}{P_1(z)} X_m(z) \quad (5.4)$$

$$\vdots$$

$$Y_l(z) = \frac{Q_{l1}(z)}{P_l(z)} X_1(z) + \ldots + \frac{Q_{lm}(z)}{P_l(z)} X_m(z).$$

Next we define $$H_{ij}(z) = \frac{Q_{ij}(z)}{P_i(z)}, \quad (5.5)$$

so that Equation (5.4) can be written in matrix form as $$\begin{pmatrix} Y_1(z) \\ \vdots \\ Y_l(z) \end{pmatrix} = \begin{pmatrix} H_{11}(z) & \ldots & H_{1m}(z) \\ \vdots & \ddots & \vdots \\ H_{l1}(z) & \ldots & H_{lm}(z) \end{pmatrix} \cdot \begin{pmatrix} X_1(z) \\ \vdots \\ X_m(z) \end{pmatrix}. \quad (5.6)$$

Integration of Sensors into Component

Figure 2:
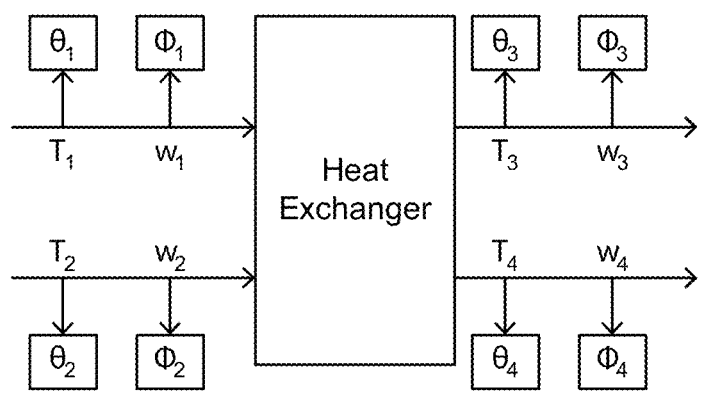
FIG. 2 is a schematic drawing of temperature and flow rate measurements at the inlets and outlets of a heat exchanger.

Sensors can be integrated into the component matrix in Equation (5.6) using linear system description of sensor dynamics. As an example, consider a heat exchanger with two inlets and two outlets. A schematic drawing of such system is shown in FIG. 2. Pressure measurements are usually not made at the heat exchanger inlets and outlets. Thus, explicit reference to fluid pressure is omitted from the present discussion.

As shown in FIG. 2, available data consists of discrete-time temperature measurements $\theta_1[n]$, $\theta_2[n]$, $\theta_3[n]$, $\theta_4[n]$, and discrete-time flow rate measurements $\phi_1[n]$, $\phi_2[n]$, $\phi_3[n]$, $\phi_4[n]$ The data is obtained using temperature and flow meter sensors. It is necessary to establish a mathematical relationship between the measured quantities which constrains the space of all possible data values. Such constraint will be used for estimation of measured data to detect and identify sensor failure. Let us denote the intrinsic fluid temperatures as $T_1[n]$, $T_2[n]$, $T_3[n]$, $T_4[n]$, and intrinsic flow rates as $w_1[n]$, $w_2[n]$, $w_3[n]$, $w_4[n]$. A temperature sensor can be modeled as a linear first-order discrete-time system of the form $$\theta_i[n] - a_i \theta_i[n-1] = b_i T_i[n], \quad (5.7)$$

where $0 < a_i < 1$ and $0 < b_i < 1$ are constants related to the time constant of the temperature sensor. Difference Equation (4.1) can be written in algebraic form using z-transform $$\Theta_i(z) = G_i(z) T_i(z), \quad (5.8)$$

where $G_i(z)$ is the transfer function of the $i^{th}$ temperature sensor $$G_i(z) = \frac{b_i}{1 - a_i z^{-1}}. \quad (5.9)$$

A flow meter can be modeled as a zero-order system $$\phi_i[n] = c_i w_i[n], \quad (5.9)$$

where $c_i > 0$ is a gain constant. In the frequency domain, $$\Phi_i(z) = F_i(z) W_i(z), \quad (5.10)$$

Where $F_i(z)$ is the transfer function of a flow meter $$F_i(z) = c_i. \quad (5.11)$$

As shown in Equation (5.6), in the linear regime, fluid state variables at the inlets and outlets of the heat exchanger are related via the component transfer function. Representing the component as multiple-input multiple-output (MIMO) system, and denoting component transfer function as $Q(z)$, we can write in the frequency domain $$\begin{pmatrix} T_3(z) \\ T_4(z) \\ W_3(z) \\ W_4(z) \end{pmatrix} = \begin{pmatrix} Q_{11}(z) & Q_{12}(z) & Q_{13}(z) & Q_{14}(z) \\ Q_{21}(z) & Q_{22}(z) & Q_{23}(z) & Q_{24}(z) \\ Q_{31}(z) & Q_{32}(z) & Q_{33}(z) & Q_{34}(z) \\ Q_{41}(z) & Q_{42}(z) & Q_{43}(z) & Q_{44}(z) \end{pmatrix} \begin{pmatrix} T_1(z) \\ T_2(z) \\ W_1(z) \\ W_2(z) \end{pmatrix}. \quad (5.12)$$

Using Equations (5.8) and (5.10), we can express Equation (5.12) as $$\begin{pmatrix} \Theta_3(z) \\ \Theta_4(z) \\ \Phi_3(z) \\ \Phi_4(z) \end{pmatrix} = \quad (5.13)$$

$$\begin{pmatrix} \frac{G_3(z)}{G_1(z)} Q_{11}(z) & \frac{G_3(z)}{G_2(z)} Q_{12}(z) & \frac{G_3(z)}{F_1(z)} Q_{13}(z) & \frac{G_3(z)}{F_2(z)} Q_{14}(z) \\ \frac{G_4(z)}{G_1(z)} Q_{21}(z) & \frac{G_4(z)}{G_2(z)} Q_{22}(z) & \frac{G_4(z)}{F_1(z)} Q_{23}(z) & \frac{G_4(z)}{F_2(z)} Q_{24}(z) \\ \frac{F_3(z)}{G_1(z)} Q_{31}(z) & \frac{F_3(z)}{G_2(z)} Q_{32}(z) & \frac{F_3(z)}{F_1(z)} Q_{33}(z) & \frac{F_3(z)}{F_2(z)} Q_{34}(z) \\ \frac{F_4(z)}{G_1(z)} Q_{41}(z) & \frac{F_4(z)}{G_2(z)} Q_{42}(z) & \frac{F_4(z)}{F_1(z)} Q_{43}(z) & \frac{F_4(z)}{F_2(z)} Q_{44}(z) \end{pmatrix}$$

$$\begin{pmatrix} \Theta_1(z) \\ \Theta_2(z) \\ \Phi_1(z) \\ \Phi_2(z) \end{pmatrix}.$$

Equation (5.13) can be written in the form of Equation (5.6) as $$\begin{pmatrix} \Theta_3(z) \\ \Theta_4(z) \\ \Phi_3(z) \\ \Phi_4(z) \end{pmatrix} = \begin{pmatrix} H_{11}(z) & H_{12}(z) & H_{13}(z) & H_{14}(z) \\ H_{21}(z) & H_{22}(z) & H_{23}(z) & H_{24}(z) \\ H_{31}(z) & H_{32}(z) & H_{33}(z) & H_{34}(z) \\ H_{41}(z) & H_{42}(z) & H_{43}(z) & H_{44}(z) \end{pmatrix} \begin{pmatrix} \Theta_1(z) \\ \Theta_2(z) \\ \Phi_1(z) \\ \Phi_2(z) \end{pmatrix}, \quad (5.14)$$

where $H(z)$ is an equivalent transfer function relating sensor measurements at the inlets and outlets of the component. Equation (5.14) provides an explicit relationship between the measured fluid temperature and flow rate values.

Discrete Time-Domain Model Form for Sensor Fault Detection

Returning to the component general description given by Equation (5.6)

$$\begin{pmatrix} Y_1(z) \\ \vdots \\ Y_l(z) \end{pmatrix} = \begin{pmatrix} H_{11}(z) & \cdots & H_{1m}(z) \\ \vdots & \ddots & \vdots \\ H_{l1}(z) & \cdots & H_{lm}(z) \end{pmatrix} \cdot \begin{pmatrix} X_1(z) \\ \vdots \\ X_m(z) \end{pmatrix}. \quad (5.6)$$

The theory for discrete time-domain fault detection can now be established. Since $$Y_i(z) = H_{i1}(z) X_1(z) + \ldots + H_{im}(z) X_m(z), \quad (5.15)$$

One can take the inverse z-transform of Equation (5.15) to obtain $$y_i[n] = h_{i1}[n] * x_1[n] + \ldots + h_{im}[n] * x_m[n]. \quad (5.16)$$

Where discrete-time convolution is defined as $$h[n] * x[n] = \sum_{k=-\infty}^{\infty} h[k] x[n-k]. \quad (5.17)$$

Thus, in discrete time-domain, equation (5.17) becomes $$\begin{pmatrix} y_1[n] \\ \vdots \\ y_l[n] \end{pmatrix} = \begin{pmatrix} h_{11}[n] & \cdots & h_{1m}[n] \\ \vdots & \ddots & \vdots \\ h_{l1}[n] & \cdots & h_{lm}[n] \end{pmatrix} * \begin{pmatrix} x_1[n] \\ \vdots \\ x_m[n] \end{pmatrix}. \quad (5.18)$$

Since $h[n]$ represents a physical component, it is expected that $h_{ij}[n]$ is causal, i.e., $$h_{ij}[n] = 0, \, n < 0, \quad (5.19)$$

and stable $$\sum_{n=-\infty}^{\infty} |h_{ij}[n]| = \sum_{n=0}^{\infty} |h_{ij}[n]| < \infty. \quad (5.20)$$

Thus, $h_{ij}[n]$ should consist of decaying terms. In general, the system can have an infinite impulse response (IIR), so that $h_{ij}[n]$ is an infinite series. In practice, sensor measurements are valid within sensor accuracy $\epsilon$. Therefore, the series $h_{ij}[n]$ can be truncated to a finite number of terms by setting $$h_{ij}[n] = 0, \, n > K \quad (5.21)$$

Where the number K is the largest number such that $$h_{ij}[K] < \epsilon \quad (5.22)$$

Then, the convolution in Equation (5.17) can be written as $$h_{ij}[n] * x_i[n] = \sum_{k=0}^{K} h_{ij}[k] x_i[n-k] \quad (5.23)$$

The number K is expected to be the same for all $h_{ij}[n]$, since the behavior of all transfer functions is dictated by the physics of the same component. Equation (5.18) can be written in matrix form as $$\begin{pmatrix} h_{11}[0] & \cdots & h_{11}[K] & \cdots & h_{1m}[0] & \cdots & h_{1m}[K] & -1 & \cdots & 0 \\ \vdots & & & & & & & & & \\ h_{l1}[0] & \cdots & h_{l1}[K] & \cdots & h_{lm}[0] & \cdots & h_{lm}[K] & 0 & \cdots & -1 \end{pmatrix}. \quad (5.24)$$

-continued $$\begin{pmatrix} x_1[n] \\ \vdots \\ x_1[n-K] \\ \vdots \\ x_m[n] \\ \vdots \\ x_m[n-K] \\ y_1[n] \\ \vdots \\ y_l[n] \end{pmatrix} = 0$$

Let us define $$p = m(K+1)$$

$$q = p+l \quad (5.25)$$

Equation (5.24) can be written compactly as $$C \cdot X_n = 0_{l \times 1} \quad (5.26)$$

Where C is l-by-q matrix of coefficients, which are determined by the component physics, $0_{l \times 1}$ is l-by-1 vector of zeros, and $X_n$ is q-by-1 column vector of measured data. Suppose one performs N measurements, so that r=N−K column vectors $X_n$ are placed into q-by-r matrix A $$A = (X_1 \ldots X_r) \quad (5.27)$$

Since each column of A satisfies Equation (25), we have $$C \cdot A = 0_{l \times r} \quad (5.28)$$

where $0_{l \times r}$ is a l-by-r matrix of zeros. From Equation (25), $$X_n \in \text{null}(C) \quad (5.29)$$

Since $X_n$ is in the column space of A, then col(A) is a subspace of null(C)

$$\text{col}(A) \subset \text{null}(C) \quad (5.30)$$

If sufficient number of measurements which has been made, each resulting in a linearly independent column of A, then $$\dim(\text{col}(A)) = \dim(\text{null}(C)), \quad (5.31)$$

and $$\text{col}(A) = \text{null}(C) \quad (5.32)$$

Matrix C consists of two block matrices. One of these is l-by-p matrix containing all coefficients of the transfer function. The other matrix is $-I_{l \times l}$ (negative l-by-l identity matrix). It is clear that $$\text{rank}(C) = l, \quad (5.33)$$

And $$\dim(\text{null}(C)) = p \quad (5.34)$$

Estimation of Number of Time Delays in the Model by Applying SVD to the Data

The number of time delays K is not known a-priori, and needs to be determined from the data. If all measurements were conducted with infinite precision, then one could construct matrix A such that Equation (5.28) is satisfied. In reality, sensor measurements are valid within sensor measurement accuracy ϵ. Then, Equation (5.28) becomes $$C \cdot A = \Omega \neq 0 \quad (5.35)$$

Where Ω is a l-by-r non-zero matrix with norm $$\omega = \|\Omega\| \geq \epsilon \quad (5.36)$$

That is, no matter how many time-delayed terms are included in Equation (5.24) by increasing the value of K, because of inherent uncertainty in measurements, ω will never be smaller than some number ϵ>0. Formally, $$\lim_{K \to \infty} \omega = \epsilon \quad (5.37)$$

We will use Equation (5.37) to estimate the value of K from the data. By construction in Equation (5.27), $$\text{rank}(A) = q \quad (5.38)$$

From Equation (5.35), it should be clear that $$\text{col}(A) \neq \text{null}(C), \quad (5.39)$$

And $$\dim(\text{col}(A)) > p. \quad (5.40)$$

We need to find a q-by-r matrix B with $$\text{rank}(B) = p \text{ and } \text{col}(B) = \text{null}(C) \quad (5.41)$$

which approximates A as close as possible. Such matrix B can be obtained using singular value decomposition (SVD) of A $$A = U\Sigma V^T \quad (5.42)$$

Where U is q-by-q matrix containing orthonormal basis vectors $u_i$ spanning col(A), Σ is q-by-r matrix containing q singular values $\sigma_i$ on the main diagonal and r−q columns of zeros, and V is r-by-r matrix containing orthonormal vectors $v_i$ spanning row(A). We express equation (36) as a sum of q rank-one matrices $$A = \sigma_1 u_1 \cdot v_1^T + \ldots + \sigma_q u_q \cdot v_q^T \quad (5.43)$$

Next we construct a q-by-r matrix B with rank(B)=p as a partial sum of the first p terms $$B = \sigma_1 u_1 \cdot v_1^T + \ldots + \sigma_p u_p \cdot v_p^T \quad (5.44)$$

The difference between A and B is a q-by-r matrix E with rank(E)=l given as $$E = \sigma_{p+1} u_{p+1} \cdot v_{p+1}^T + \ldots + \sigma_q u_q \cdot v_q^T \quad (5.45)$$

With $$\|E\| = \sigma_{p+1} \quad (5.46)$$

If we construct l-by-q matrix C as $$C = (u_{p+1} \ldots u_q)^T = \begin{pmatrix} u_{p+1}^T \\ \vdots \\ u_q^T \end{pmatrix} \quad (5.47)$$

Then $$C \cdot B = \begin{pmatrix} u_{p+1}^T \cdot B \\ \vdots \\ u_q^T \cdot B \end{pmatrix} = 0_{l \times r}, \quad (5.48)$$

because vectors $u_i$ are orthonormal. Therefore $$C \cdot A = \Omega = \begin{pmatrix} \sigma_{p+1} v_{p+1}^T \\ \vdots \\ \sigma_q v_q^T \end{pmatrix} \quad (5.49)$$

And $$\|\Omega\| = \sigma_{p+1} \quad (5.50)$$

Therefore, the value of $\sigma_{p+1}$ serves as an indicator of how many time-delayed terms need to be included in the state vector $X_n$. The algorithm for finding K consists of composing the matrix A with progressively increasing number of time-delayed terms, starting with K=0. For each value of K, we perform SVD of A to find $\sigma_{p+1}$. If $\sigma_{p+1} \le \epsilon$, the algorithm stops. Otherwise, we set K=K+1 and repeat the steps described above. In principles, the value of $\epsilon$ can be deduced from the convergence study. In practice one may set the value of $\epsilon$ as some fraction of the mean value of the measured data.

Once the number K of time lags is determined, the orthonormal basis of the training data is given as the first p column vectors of the matrix U $$B=(u_1 \ldots u_p). \qquad (5.51)$$

The capability to monitor transients, i.e., the extrapolation capability, is introduced into AFTR-MSET by replacing the memory matrix approach of MSET with the basis of training vectors. The basis vectors of the training data are stored as column vectors in a matrix B, which is subsequently used for all estimation computations. Estimation method using basis attempts to find the best fit to the observation vector by using a linear combination of basis vectors. Such estimation method is, by definition, scalable for processing observation vectors of any amplitude. Since column vectors of the basis are linearly independent by definition, using the basis instead singular memory matrix D eliminates the need for the nonlinear MSET operator $\otimes$ to enable inversion of the singular matrix $D^T D$. In fact, the need to matrix inversion, which is a computational burden when large matrices are used, is eliminated altogether in AFTR-MSET. This is because the basis could be chosen to be orthonormal, so that $B^T B=I$ (identity).

Sensor Evaluation

Sensor fault detection and identification of AFTR-MSET is based on computing the residual error vector. The error vector has zero entries corresponding to "good" sensors, and non-zero entries corresponding to failed sensors. The correct error vector is found as the residual which produces the best fit of the error-free estimate of the observation to the column space of the basis matrix B. The residual which localizes errors to the "bad" sensors is found by a search in the space of all possible error vectors.

For an observation a made during the monitoring phase, the general case is that among the n sensors, an unknown number could be faulty. The error-finding algorithm consists of forming a hypothesis that k sensors at specific locations have failed. The algorithm detects fault among n sensors by a majority vote. That is, the assumption is that only k<n/2 sensors can fail at any given time. For each hypothesis, the n-by-1 residual error vector e is created, such that k elements of e at certain locations are allowed to take on non-zero values, while the rest of n−k elements of e are fixed at zero. For example, if the hypothesis is that only the $1^{st}$ sensor has failed, the error vector is $$e=[e_1 \ldots 0 \ldots 0]^T \qquad (5.52a)$$

where the $e_1$ can have any value (free variable), while all other entries of e are fixed to be zeros. If the hypothesis to be tested is that $1^{st}$ and $2^{nd}$ sensors have failed, then we create an error vector of the form $$e=[e_1 e_2 0 \ldots 0]^T \qquad (5.52b)$$

where the entries $e_1$ and $e_2$ can have any values (free variables), while all other entries of e are fixed at zero. For each hypothesis, the algorithm computes the error-subtracted vector $$v=a-e \qquad (5.54)$$

Next, the algorithm finds the projection of v on the column space B $$p=BB^T v \qquad (5.55)$$

Since p∈Col(B), then p is the observation of the system where all n sensors are "good." The algorithm finds the values of the k free variables of e such that the Euclidean distance ($l_2$-nom) between the error-subtracted vector and its projection $$d=\|v-p\| \qquad (5.56)$$

is minimized. For a given error vector e, the value of d is a metric of the hypothesis test. Equation (5.56) can be formulated as a root-finding problem and solved using the initial guess $$e_0=[0 \ldots 0 \ldots 0]^T. \qquad (5.57)$$

If the observation is composed with K time delays for each input variable, fault detection consists of two stages. During the first pass, each set of K+1 entries corresponding to each input sensor is treated as a block, where entries of the error vector e within the block are not allowed to vary independently. Using the initial guess of Equation (5.56), the algorithm finds the error vector $e_1$ such that d in Equation (5.56) is minimized. On the second pass, the algorithm uses the error vector $e_1$ as the initial guess, and allows the entries within each K+1 long block to vary independently. The two-stage approach reduces search time by constraining the search dimension to k sensors when an arbitrary initial guess $e_o$ of Equation (5.56) is used in the first pass. Time-delayed values for the same sensor are expected to have fairly close numerical values. Thus, when the constraint on search dimension is relaxed in the second pass, and the search dimension is increased up to k(K+1) sensors, initial guess of $e_1$ enables fast algorithm convergence.

The algorithm searches through entire hypothesis space to find the best guess, i.e., the hypothesis which results in the smallest distance d. Algorithm implementation consists of two nested loops. The outer loop iterates on the total number k of sensors assumed to be faulty, where k=0, . . . , n/2−1. Since we expect that only a small subset of sensors will fail at any given time, in practice the subspace of all possible errors could be limited to the largest k much smaller than n/2. The inner loop iterates on possible combinations of assumed k faulty sensors distributed among all n sensors. For a given k, locations of the possible faulty sensors are chosen as combinations (permutations without repetitions). For each value of k in the outer loop, the number of iterations in the inner loop is $$\binom{n}{k} = \frac{n!}{k!(n-k)!}.$$

The value of d computed for each hypothesis (error vector e) is compared with the smallest value of stored in computer memory in the variable err. If on the current iteration, d<err, then current d and the corresponding error vector e are stored in the memory. At the start of the search, we initialize err to ∞. The smallest value $d_{min}$ found after searching through the entire hypothesis space represents the numerical accuracy of the solution. If the system is linear, we expect that $d_{min}$ is on the order of machine accuracy (~$10^{-10}$). If the system is slightly non-linear, approximations involved in linearization procedure may result in higher values of $d_{min}$.

The following non-limiting examples illustrate various aspects of the invention.

EXAMPLE I

A "test platform" has been developed for performance testing of the AFTR-MSET algorithms. The platform takes as measured data the simulation data generated by the GPASS code for the thermal-hydraulic behavior of individual plant components (such as heat exchanger and coolant pipes) in response to user-supplied forcing functions. The AFTR-MSET algorithms are accessible through a GUI and the performance of the algorithms can be evaluated by running them on different GPASS transient data sets and injecting signals into sensor models to simulate failure.

Figure 3:
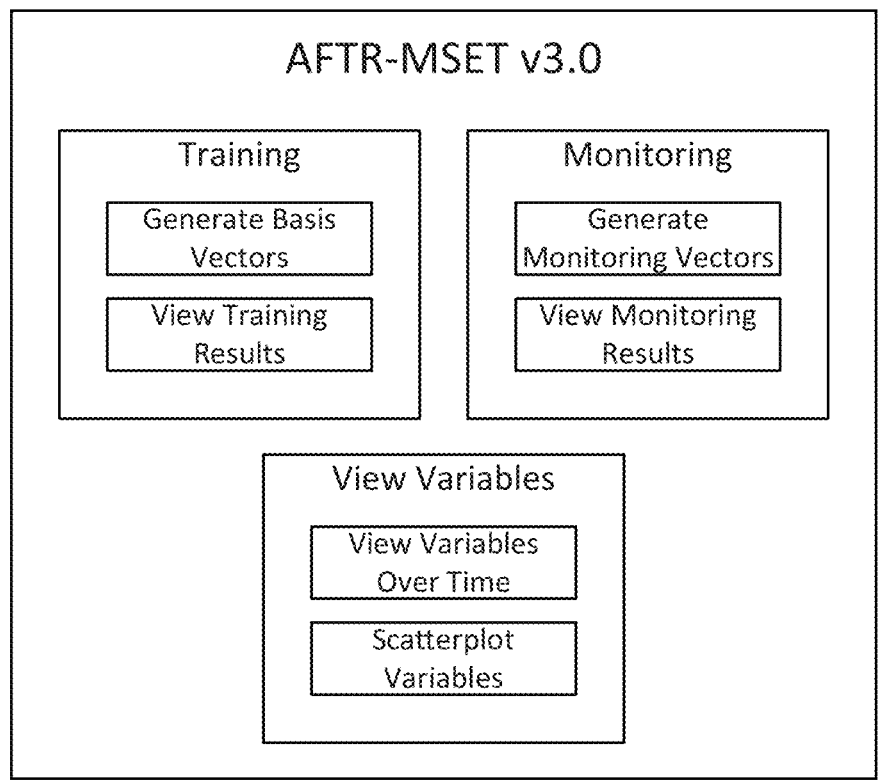
FIG. 3 illustrates the main functionalities of the AFTR-MSET methodology as they appear on the test platform GUI.

The platform provides single-cluster and multi-cluster development environments. Both environments provide a graphical user interfaces (GUIs) for communicating with the simulation data and for directing the algorithms or methods and system. There are three main functionalities: creation of models of a system based upon training data, estimation sensor values for monitoring data that is input, and a viewing capability for comparing training, monitoring, and estimation data. These three capabilities are accessed through the GUI shown in FIG. 3. The single-cluster environment uses all data points to create one time-lagged data matrix A and its associated vectors B; this single linear model is applied to all monitored points. The multi-cluster environment groups the data points into clusters. In the monitoring phase, data points are sorted into one of the clusters.

The training section of the single-cluster development environment allows the user to read in training data from a GPASS output file and can be easily expanded to import other file types. These files can be loaded from any directory location accessible to the user's computer.

Figure 4:
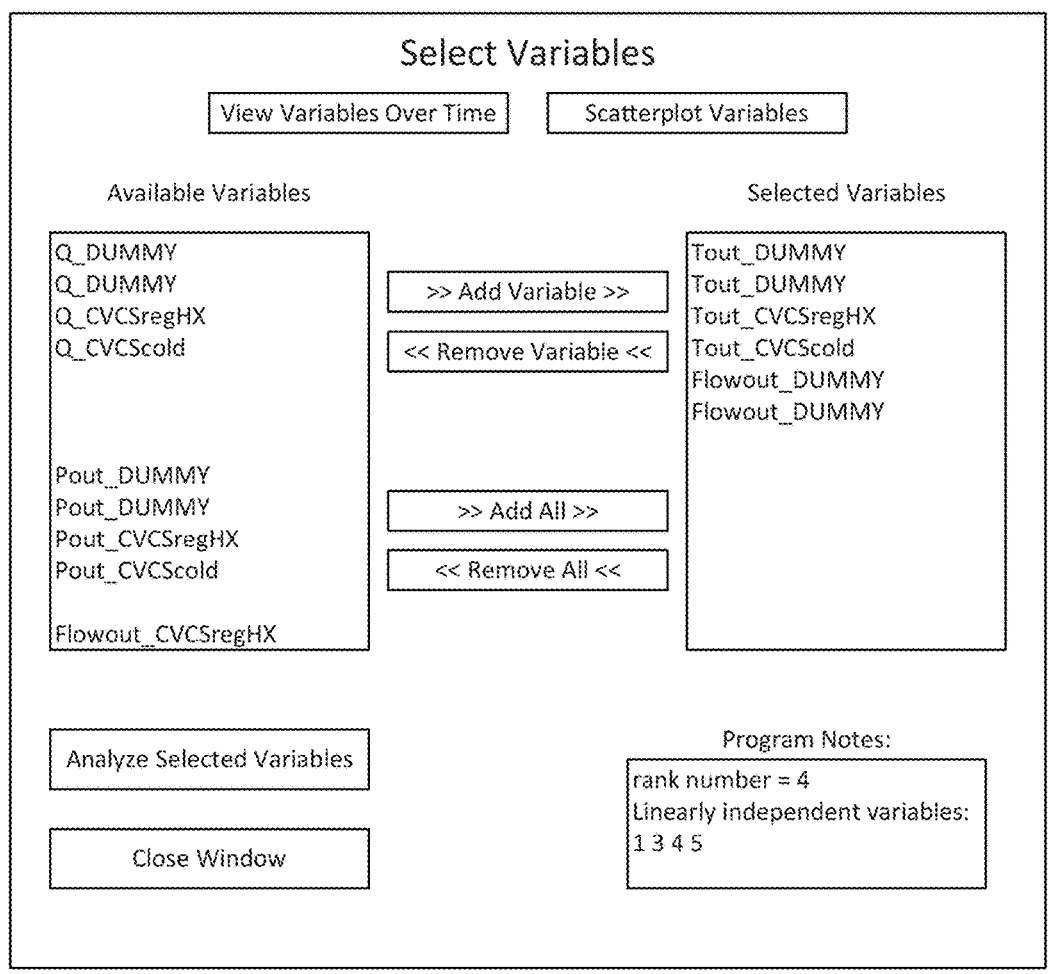
FIG. 4 illustrates a window for user selection of variables for composing training data data.
Figure 9A:
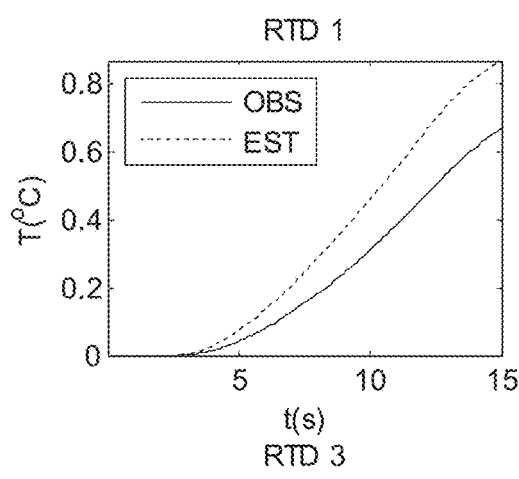
Figure 9B:
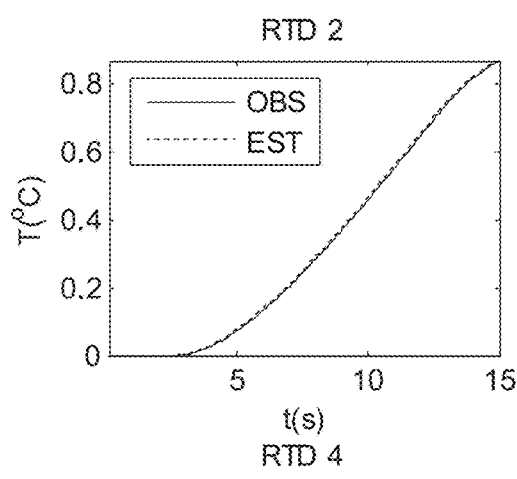
Figure 9C:
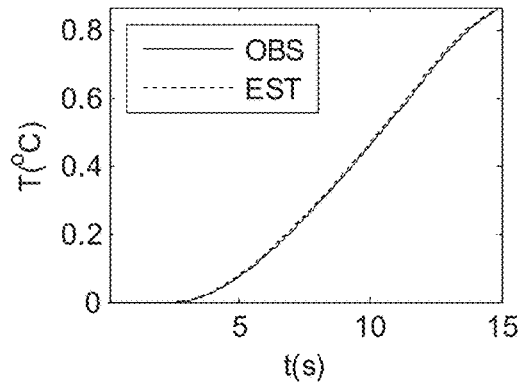
Figure 9D:
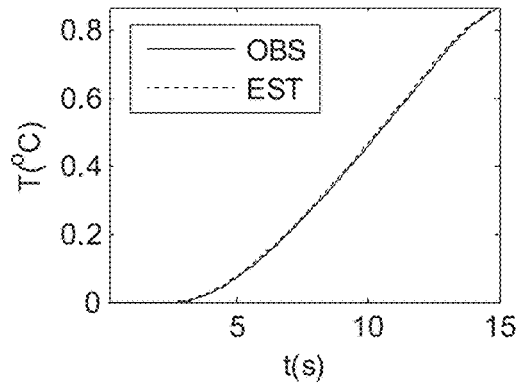
Figure 10A:
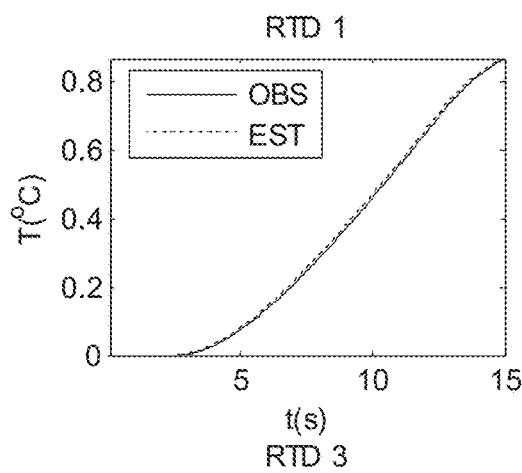
Figure 10B:
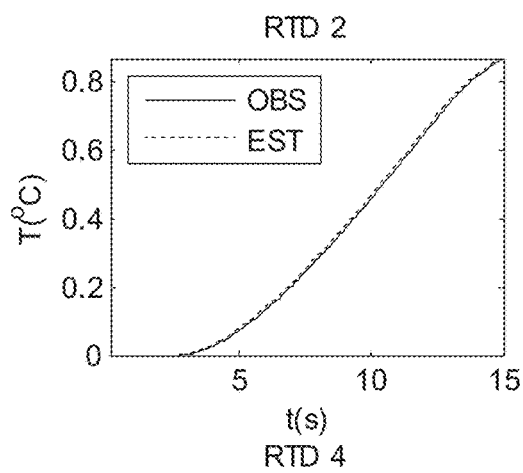
Figure 10C:
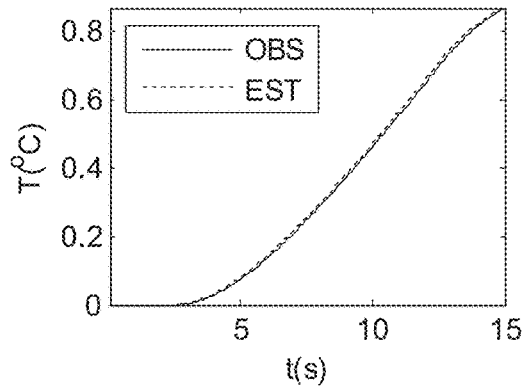
Figure 10D:
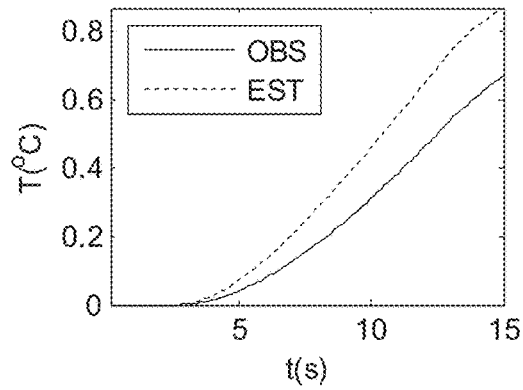

The training section allows the user to select those variables in the training file that are to be used to create a model as appears in FIG. 4. The environment has a scatter plot capability to permit comparing variables against each other and to view variables over time prior to variable selection. This capability provides a convenient way to uncover non-linear relationships between variables or identify quasi-static systems. Additionally, the GUI provides several methods to predict the number of linearly independent variables and to identify linearly dependent and independent variables. This identification of variables informs the next step, where the program requires the user to identify selected variables as either inputs or outputs.

The system basis vectors are prepared in the next step as appears in FIG. 5. The user specifies values of settings used to calculate the number of lags and generate the basis vectors. Feedback after basis vector creation informs user decisions for the above settings: Graphs facilitate troubleshooting by illustrating the convergence trend of error residuals with program parameters, pop-ups display critical values, and a specialized View Vectors GUI combines with the MATLAB workspace to allow the user to view any and all information generated during the creation of the basis vectors. The user can view basis vectors at any time in the View Vectors GUI and the MATLAB workspace. Multiple basis vector files can be opened side by side, facilitating comparisons between vectors.

After the user is satisfied with the results of the basis vector creation, the generated basis vectors, and all associated information, can be saved in a file for later use. The basis vector file name chosen by the user should reflect the date of creation, training data name, and basis vector settings to facilitate later use.

The monitoring section of the single-cluster environment allows the user to load basis vectors from any file location in the user's computer. After loading the basis vectors, the user is shown the variables and settings that were used to create the vectors; these settings specified in basis vector creation are also applied to the monitoring data to prevent errors. If the basis vectors are satisfactory, the user selects the data file that they would like to monitor; the environment can read in training data from a previously generated GPASS output file. The development environment performs a check to ensure that the data sets for training and monitoring are consistent, and then proceeds to the next step.

The user can specify a particular subset of the entire monitoring data file to monitor as appears in FIG. 6; to inform this decision, the environment allows the user to graph variables of the monitoring dataset over all points in time. Next, the user is given the option to artificially inject a user-specified fault into any and all variables they choose prior to monitoring; this allows the user to test the robustness of the system by simulating various degrees of sensor failure.

The development environment provides feedback on the outcome of the monitoring process. During monitoring, the program facilitates troubleshooting by informing the user of which data point AFTR-MSET is estimating. The View Monitoring Results GUI as appears in FIGS. 7 and 8 allows the user to review the generated monitoring results at any time, even during training and monitoring, in the View Monitoring Results GUI and the MATLAB workspace. Multiple results files can be opened side by side, facilitating comparisons between monitoring test runs.

After the user is satisfied with the monitoring results, the development environment allows them to save the generated results, and all associated information in a file for later access.

The multi-cluster environment has all training functionalities of the single-cluster environment. Additionally, the user is given the ability to specify what number of clusters the program should create. The View Vectors GUI is upgraded to allow the developer to view the characteristics of each cluster side-by-side.

The multi-cluster environment has all monitoring functionalities of the single-cluster environment. Additionally, the program sorts each measurement vector (i.e., each point in time) from the passed-in monitoring data into one of the training clusters; then, the assigned cluster's vectors are applied to the point in order to create the estimated monitoring data. The user can plot the error of each cluster's data points as a function of distance from the cluster's mean value, and the View Monitoring Results GUI is upgraded to take the cluster used to generate the point into account.

Currently, each estimated data point is created using only one cluster's vectors. In the future, vectors from a certain number of nearby clusters might be weighted and included in the calculation for the estimated data point to give an even more accurate estimation.

Future enhancements are planned for the multi-cluster training capability. The View Vectors GUI will be updated to allow for more detailed analysis of individual clusters. Currently, the program generates a user-specified number of clusters; in the future, the program may automatically detect the number of clusters needed to satisfy a certain set of conditions. In the future, the program will perform checks to ensure that the inputs and outputs used to train the system actually influence or drive the system in question. Finally, the training algorithm currently only creates one set of clusters at a time; future versions of the program may generate models with multiple numbers of clusters, and then allow the user to directly compare models before selecting which model to save.

EXAMPLE II

A series of test problems was defined and the performance of the AFTR-MSET algorithms for solving them was assessed. These problems represent a progression in estimation problem complexity and involve different combinations of instances of sensor dynamics, component dynamics, more than one forcing function changing at a time, and component nonlinearities. The test problems and results are described below in order of increasing complexity of the phenomena that underlie the physical system on which estimation is performed.

The simplest case of a component is a straight section of a pipe in which the fluid temperature is monitored by several redundant resistance temperature detectors (RTDs) located next to each other. We consider a case study of fault detection in a cluster of four RTD's. Such a collection of sensors might be found in the reactor outlet pipe of a pressurized water reactor for input to the reactor shutdown system. The RTD's 1 through 4 with respective temperature outputs $T_1(t)$ through $T_4(t)$ are driven by the same forcing function temperature. The RTD response to changes in pipe coolant temperature was simulated using the dynamic model of Example II.

In the training transient, all four RTD's are "normal" with $\tau=3.0$ s. In the monitoring transient, we introduce a sensor fault by assigning $\tau=6.0$ s to a failed RTD, while a "normal" RTD still has $\tau=3.0$ s. FIG. 9(a)-9(d) shows the result for fault detection during monitoring stage, where the first RTD has failed. This figure shows that the failed sensor signal given by the "OBS" curve (i.e. observed) is successfully corrected for to yield the "EST" curve (i.e. estimated) which overlays the sensor response if the RTD had not failed (as it well should). FIG. 10(a)-10(d) shows the result for fault detection during monitoring stage, where the fourth RTD has failed. Similar results were obtained when testing for algorithm fault detection and identification capability of the other sensors.

EXAMPLE III

A typical network of correlated sensors involves plant components inter-dispersed among the sensors. For a particular component the sensors that envelope the component are correlated through the physics of the component. In the two cases below a heat exchanger is operated quasi-statically about an operating point so that its behavior is essentially linear. In the first case the sensors respond quasi-statically. In the second case, the response of the temperature sensors is dynamic.

No Dynamic Sensors—The case of quasi-static sensors and component is considered first. That is the forcing functions driving the component are changing slowly enough that the neither the sensor nor the component dynamics are excited.

The component considered is the tube-and-shell heat exchanger of Example VIII. This component has two inputs ($T_1$ and $T_2$) and two outputs ($T_3$ and $T_4$) and constant flow rates. In this study the GPASS code used to generate simulation data for this component had energy storage disabled. The training transient consisted of the first two-thirds (i.e. 0-66 s) of the fault-free monitoring transient. The error c (primarily small non-linearities) was estimated to be on the order $10^{-3}$. During monitoring, a sinusoidal fault was injected into one of the sensors. Results of fault detection and identification in the first sensor using the system basis learned from the training transient are displayed in FIGS. 11(a)-11(d). This figure shows that the failed sensor signal given by the "OBS" curve (i.e. observed) is successfully corrected for to yield the "EST" curve (i.e. estimated) which overlays the sensor response if the RTD had not failed (as it well should). Results of fault detection and identification in the second sensor are displayed in FIGS. 12(a)-12(d).

EXAMPLE IV

Dynamic Sensors—The case dynamic RTDs and a quasi-static component is considered next. In this case the forcing functions driving the component are changing slowly enough that the component dynamics are not excited. The component considered is a printed circuit heat exchanger (PCHE). The heat transfer channel dimensions in a PCHE are of the order millimeters giving thermal time constants of the order of tenths of a second. The RTDs response on the other hand is of the order of seconds to coolant temperature change. The RTD response was simulated using the dynamic model of Example VII.

A schematic diagram of a PCHE with four RTD's is shown in FIG. 13. In our labeling scheme, RTD's 1 and 2 have temperature inputs $u_1(t)$ and $u_2(t)$, and corresponding temperature outputs $x_1(t)$ and $x_2(t)$. Temperatures $u_1(t)$ and $u_2(t)$ are also the "hot" and "cold" inputs to the PCHE, and temperatures $u_3(t)$ and $u_4(t)$ are the corresponding "hot" and "cold" PCHE outputs. In turn, temperatures $u_3(t)$ and $u_4(t)$ are the inputs to RTD's 3 and 4, with temperatures $x_3(t)$ and $x_4(t)$ as the corresponding RTD outputs. PCHE output temperatures $u_3(t)$ and $u_4(t)$ are both functions of the input temperatures $u_1(t)$ and $u_2(t)$. Correlation between PCHE inputs $u_3(t)$ and $u_4(t)$ and inputs $u_1(t)$ and $u_2(t)$ can be very nearly linear if the PCHE is a high-temperature recuperator (HTR) or intermediate heat exchanger (IHX) types, or the correlation could be non-linear if the PCHE is precooler (PRE) type.

Training data consisted of transient observations with all four "good" RTD's with $\tau=3.0$ s. In the monitoring transient, we introduce sensor fault by assigning $\tau=6.0$ s to any failed RTD, while any "good" RTD still has $\tau=3.0$ s. FIGS. 15(a)-15(d) shows the result for fault detection during monitoring stage, where the fourth RTD has failed. This figure shows that the failed sensor signal given by the "OBS" curve (i.e. observed) is successfully corrected for to yield the "EST" curve (i.e. estimated) which overlays the sensor response if the RTD had not failed (as it well should). In this estimation, we used rank-one basis of the training data. Similar results were obtained when testing for algorithm fault detection and identification capability of all other sensors.

The tube-and shell heat exchanger of Example VIII with mass and energy storage turned off and an input change that introduces significant non-linearities is taken as representative of a dynamic linear component. This component has two temperature inputs (hot and cold side inlet temperatures), two coolant mass flow rate inputs (hot and cold side inlet mass flow rates) and two temperature outputs (hot and cold side outlet temperatures). Simulation data for this heat exchanger was generated using the GPASS code.

The training data shown in FIGS. 16(a)-16(f) correspond to a ramp flow reduction from 100 to 50 percent on the hot side of the heat exchanger. All other inputs are constant. That this introduces a significant non-linearity is apparent in FIG.

17 where the hot side coolant mass flow rate is plotted against the cold side outlet temperature. In a linear model there are no non-zero appearances of terms that are the products of inputs and outputs. When the model of Example VIII is linearized a term that is the product of hot side flow rate perturbation and cold side outlet temperature perturbation appears. If the model is strictly linear, then this term must be zero. Or equivalently, simulation data for which this is not the case represents non-linear operation of the heat exchanger. One concludes from FIG. 17 that the heat exchanger for the range of operation shown in FIGS. 16(a)-16(f) is non-linear.

Estimation for this non-linear problem was performed using the multi-cluster capability described hereinbefore. The monitoring data generated using the GPASS code for presentation to the estimator is for a ramp flow reduction from 100 to 30 percent on the hot side of the heat exchanger. The sensor data presented for monitoring appear with the quiescent operating point subtracted out. The result for a bias error of +2° C. injected into the monitoring data for the cold side outlet temperature is shown in FIGS. 18(a)-18(d). This figure (bottom left plot) shows that this simulated failed sensor signal given by the "OBS" curve (i.e. observed) is successfully corrected for to yield the "EST" curve (i.e. estimated) which overlays the sensor response if the RTD had not failed (as it well should).

EXAMPLE VI

The tube-and shell heat exchanger of Example VIII with mass and energy storage enabled and with small input perturbations about an operating point is taken as representative of a dynamic linear component. This component has two inputs ($T_1$ and $T_2$) and two outputs ($T_3$ and $T_4$) and constant coolant mass flow rates. Again simulation data for this heat exchanger was generated using the GPASS code. The sensor data presented in the figures below for training and monitoring appear with the quiescent operating point subtracted out. Training and monitoring transients used in this study are shown in FIGS. 19(a)-19(d). FIG. 20 displays the error $\epsilon$ as a function of the number of time delays K in the training data. Next, we injected sinusoidal fault into the first sensor in the monitoring transient, and attempt to detect and identify the fault using the system basis learned from the training data. FIGS. 21(a)-21(d) display the results of fault detection and identification using K=0 time delays in the state vector for both training and monitoring data. The system basis consist of two 4×1 vectors. The fault is detected and identified correctly, but the estimation is not exact, as expected from the magnitude of the error for K=0 in the FIG. 20. Results of fault detection and identification using K=1 delays are shown in FIGS. 22(a)-22(d). In this case, the system basis consists of four 6×1 vectors. As expected from the magnitude of the error for K=1 in FIG. 20, accuracy of estimation is improved.

Improving plant performance through the use of advanced digital technologies imposes stringent requirements on the quality of sensor data. Validated sensor data is a prerequisite for any method which seeks to improve operator awareness of plant thermal state and equipment condition. The overarching issue among the different data-driven sensor validation algorithms that presently exit relates to the high-false alarm rate. The origin of false alarms include the inability of many algorithms to perform extrapolation, the inability of many algorithms to operate with data where plant dynamics have been excited, and the absence of guidelines for how the measurement vector should be composed or what is an appropriate set of training data to ensure the physical behavior of the system is adequately captured. This report describes the development of methods that address these root causes of false alarms. Results are presented for several applications to important and outstanding sensor validation problems.

Preparations are in place to advance the sensor validation AFTR-MSET technology to the next level of performance testing. Whole-plant simulator trials will provide for additional conditions not achievable under the existing test stand environment. It will provide for integration of the algorithms across multiple components rather than single components as has been the case to date. It will provide for a human factors assessment of how operators might interact with the technology as the full-scale simulator replicates the physical space and data display and communications technologies found in an advanced power plant and thus represents a realistic environment for assessing operator use. Whole-plant simulator trials will also provide a forum for demonstration to utilities. All such features of the whole-plant simulator environment will serve to guide the development of AFTR-MSET for deployment in existing and future plants.

EXAMPLE VII

The parameter characterizing any sensor performance is the sensor response time, which is completely determined by the sensor physics. Depending on the ratio of sensor response time $\tau$ to the characteristic time scale $\xi$ of the physical system under measurement, all sensors can be classified as either zero-order or first-order dynamic systems. If $\tau$ is much smaller than $\xi$, then sensor dynamics can be ignored. In this case, sensor response can be considered as instantaneous, and the sensor can be treated as a quasi-static zero-order system. If $\tau$ is on the order of, or larger than $\xi$, then sensor has to be described as a first-order dynamic system with time lag. For example, changes in macroscopic fluid properties such as temperature, pressure or flow rate occur with characteristic time scales of seconds. Pressure transmitters and flow meters have response times smaller than typical fluid transient time scales. Thus pressure and flow meters can be regarded as zero-order systems. On the other hand, temperature detectors, which are based on heat transfer phenomena with response time on the order of seconds, must be considered as first-order systems.

One of the most common temperature sensors in nuclear energy industry is a resistance temperature detector (RTD). System-level performance of RTD consists of producing a time-lagging output in response to an arbitrary input. Schematics of a linear system which models RTD performance is shown in the schematic below. The time-dependent input u(t) is the ambient fluid temperature, and the output x(t) is the time-dependent temperature in the core of the sensor. Delayed response is characterized by a time constant $\tau$.

Phenomenological first-order system model of RTD response consists of the first-order ODE $$\tau \frac{dx(t)}{dt} + x(t) = u(t) \qquad \text{(A.1.1)}$$

Early signs of dynamic sensor physical degradation manifest themselves in slower sensor response, or increase in the time constant τ. According to recently issued Nuclear Regulatory Commission (NRC) guidelines, a resistance temperature detector (RTD) is considered to be defective if its time constant approximately doubles.

Physics-Based Sensor Model

In order to gain insight into physical mechanisms of sensor degradation, one needs to establish a link between the phenomenological RTD model and the physical properties of the sensor and the ambient fluid. To address this need, we develop a physics-based model of heat transfer in RTD, which enables computing τ using the information regarding RTD and ambient fluid material properties. Such model can be integrated into plant simulation software to serve as a platform for testing algorithms for sensor failure detection under realistic conditions. Since a large number of independently functioning sensor simulation modules needs to be added to a plant simulator, it is important to produce computationally light-weight sensor modules. This is accomplished by developing a stand-alone 1-D finite element model (FEM) of heat transfer in RTD, which can be implemented in a high level computer language such as MATLAB or FORTRAN.

An RTD is a long and narrow cylindrical metallic structure with a typical diameter in the range from 0.6 cm to 1 cm. An RTD is inserted into a plant cooling system pipe to an immersion depth of 5 cm to 10 cm in the process fluid. RTD heat sensing element is located in the bottom 1 cm to 3 cm long section of the detector. The heat sensing element is a cylindrical layered structure, at the core of which there is a thin platinum wire wounded on a grooved cylinder called mandrell. The mandrell, which is made of an insulation material, such as Alumina ($Al_2O_3$), is enclosed by a concentric cylinder of insulation material of the same type. The insulation, in turn, is enclosed by a concentric cylinder of stainless steel called sheath. Depending on the installation mode, RTD's are either direct immersion (wet-type) or thermowell mounted (well-type). A wet-type RTD is installed into a transvers hole in the cooling system pipe, so that the sheath is in direct contact with the process fluid. A well-type RTD is installed into a thermowell, which had been previously mounted in the cooling system pipe. A thermowell is a hollow stainless steel cylinder with an average outer diameter of 1 cm to 2 cm, which is in direct contact with the process fluid. In this paper, we consider the performance of well-type RTD. From the point of view of heat transfer in the sensor, thermowell is considered as an integral component of RTD. A schematic drawing of transverse cross-section of well-type RTD is shown in FIG. 23. Note that mandrell is an inner part of the insulation, and therefore no material boundary is drawn around mandrell. In the remainder of this paper, mandrell will not be treated separately from the rest of the insulation layer.

Radial dimensions and material regions of the RTD in this study are presented in Table 1. Radius of mandrell indicates the location of the sensing wire. Although surfaces of RTD are slightly slanted, in this paper we make straight cylinder approximation of the RTD shape.

TABLE 1

Radial Dimensions and Material Regions of Well-Type RTD

| Region | Symbol | Dimension (outer) | Material |
|---|---|---|---|
| Mandrell | $r_{mand}$ | 1.2 mm | Alumina ($Al_2O_3$) |
| Insulation | $r_{ins}$ | 2.335 mm | Alumina ($Al_2O_3$) |
| Sheath | $r_{sh}$ | 3.175 mm | Stainless Steel-316 |
| Thermowell | $r_{well}$ | 5.175 mm | Stainless Steel-316 |

In our model of heat transfer, the thermocouple is subdivided into concentric cylindrical nodes numbered 1 to n. The system of n differential equations governing heat transfer between the nodes of RTD can be written in the matrix form as $$\dot{T} = A \cdot T + T_f F \quad (A.1.2)$$

Where the vector of temperatures is $T=(T_1, \ldots, T_n)$, A is a tri-diagonal heat transfer matrix, $T_f F$ is a forcing vector function, and $T_f$ is the ambient fluid temperature. The details of 1-D FEM model derivation are given in the appendix. One of the principle results of the analytical RTD model is that the response time of an RTD is equal to the sum of the absolute values of the eigenvalues of the tri-diagonal heat transfer matrix A $$\tau = \sum_{i=1}^{n} \frac{1}{|\lambda_i|} \quad (A.1.3)$$

Numerical experiments have shown that this result is independent of the number of nodes n.

Validation of 1-D FEM RTD Model with 3-D COMSOL Simulations

Using 3-D COMSOL simulations of heat transfer in RTD, we performed a validation study of 1-D FEM model of RTD with n=5 nodes. In this study, the forcing function $T_f$ consisted of a step change in temperature from 20 C to 70 C over 0.1 s. The process fluid was water. Heat transfer coefficient was calculated using $$= 2.2 * 10^{-5} \frac{kg}{m*s},$$

D=1 m, v=2 m/s. (see the Appendix for definitions). With these values, we obtained $$h_f = 2.7 * 10^4 \frac{W}{m^2 K}$$

for water. Fluid temperature $T_f$, and temperature responses of RTD calculated using 3-D COMSOL model $T_{COMSOL}$ and 1-D five-node FEM model $T_{RTD}$, are plotted as functions of time in FIG. 24. Numerical solution to the 1-D five-node model was obtained with MATLAB "ode45" RK ODE solver. $T_{RTD}$ is the temperature in the middle of the second node. It can be seen from FIG. 24 that 1-D and 3-D models of RTD response are in very good agreement.

We can estimate the response time τ of the RTD from the graphs in FIG. 24. From the COMSOL simulations, τ≈1.7 s, while and 1-D five-node model yields τ≈1.9 s. From the spectral analysis developed in the previous section, using time-averaged material parameters we obtain $$\tau = \sum_{i=1}^{5} \frac{1}{|\lambda_i|} \approx 1.9 \text{ s}$$

as well. Slight disagreement between COMSOL and 1-D model may come from using constant (temperature-independent) values of material parameters in COMSOL simulations.

Table 2 lists the available design data for the Braidwood CVCS Regenerative Heat Exchanger which has a design heat transfer rate of about 3.22 MW per unit (two units total). See the heat exchanger 200 schematic FIG. 25.

TABLE 2

Regenerative Heat Exchanger Design Conditions

| Design Data | Tube Side 210 | Shell Side 220 |
|---|---|---|
| Design Pressure [MPa] | 21.37 | 17.13 |
| Design Temperature [C.] | 343 | 343 |
| Flow Rate [kg/s] | 3.45 | 4.70 |
| Inlet Temperature [C.] | 54 | 293 |
| Outlet Temperature [C.] | 269 | 143 |

From the reported data, the LMDT can be calculated and is equal to 49.60° C. Therefore, following the LMDT and heat transfer rate relationship, the product between the total heat transfer area and the total heat transfer coefficient can be obtained (in this case arbitrarily referred to the outer tube heat transfer area):

$$(U \cdot A)\big|_{out} = \frac{Q}{LMTD} = \frac{3.22 \, [MW]}{49.60 \, [°C.]} \square 65 \left[\frac{kW}{°C.}\right] \quad (A.2.1)$$

In addition, the total heat transfer coefficient can be calculated as:

$$\frac{1}{U}\bigg|_{out} \square \frac{1}{\frac{1}{h_{in}} \cdot \frac{D_{out}}{D_{in}} + \frac{1}{h_{out}} + D_{out} \cdot \frac{\ln\left(\frac{D_{out}}{D_{in}}\right)}{2 \cdot k_{tube}}} \quad (A.2.2)$$

where $h_{in}$ and $h_{out}$ are the heat transfer coefficients on the tube and shell side, respectively. The outer tube heat transfer area is also given by:

$$A\big|_{out} = N_{tubes} \cdot L_{tubes} \cdot \pi \cdot D_{out} \quad (A.2.3)$$

To find the tube diameter, length and number an iterative process shall be initiated. By guessing the tube ID and OD dimensions, the P/D ratio on the shell side and the number of tubes and applying adequate heat transfer correlations on the tube and on the shell sides, the total heat transfer coefficient can be calculated (using Equation A.2.2). At this point, also the outer heat transfer area can be uniquely determined (through equation 1) and so also the last missing parameter, which is the tube length (by using Equation A.2.3). By iterating on the initial guesses, reasonable values can be finally obtained for both dependent and independent parameters. The tube thickness was fixed at 1/16 of an inch, following the steam generator design criterion which is similar, in terms of design pressure, to the conditions for the regenerative heat exchanger.

Table 3 reports calculated parameters of interest for the suggested HX configuration:

TABLE 3

Regenerative Heat Exchanger Design with ½ inch OD Diameter

Input Parameters

| Number of Tubes | 256 |
|---|---|
| Tubes Array | 16 × 16 - Square |

TABLE 3-continued

Regenerative Heat Exchanger Design with ½ inch OD Diameter

| Tube Outside Diameter [m] | 0.0127 |
|---|---|
| Tube Thickness [m] | 0.0015875 |
| Tube Pitch/Diameter Ratio | 1.25 |

Calculated Parameters

| Tube Length [m] | 5.84 | |
|---|---|---|
| | Tube Side | Shell Side |
| Mass Flux [kg/(s · m²)] | 189 | 146 |
| Average Density [kg/m³] | 915 | 854 |
| Average Flow Velocity [m/s] | 0.21 | 0.17 |
| Dynamic Viscosity [Pa · s] | 0.00017222 | 0.000125999 |
| Average Reynolds Number | 10467 | 14763 |
| Average Prandtl Number | 0.9 | 0.86 |
| Average Nusselt Number | 36 | 59 |
| Average Thermal Conductivity [W/(m · K)] | 0.675 | 0.664 |
| Average Heat Transfer Coefficient [W/(m² · K)] | 2569 | 3068 |

It should be noted that the iterative process was stopped when all the parameters listed in Table 3 were found to be 'reasonable' following engineering judgment, such as having turbulent flow both inside and outside the tubes, limited flow velocities and a reasonable tube length. Notably, the aspect ratio of the regenerative heat exchanger would approximately be 20:1, which is quite large. However, such a high aspect ratio was judged to be reasonable by looking at available pictures and images of existing CVCS regenerative heat exchangers. The heat transfer correlations used to calculate the heat transfer coefficients are listed below:

Tube Side: Dittus-Boelter Correlation:

$$Nu = 0.023 \cdot Re^{0.8} \cdot Pr^{0.4}$$

Shell Side: Presser Correlation (valid for flow along infinite array of rod bundles):

$$Nu = \psi \cdot Nu_{circular\ tube} = \psi \cdot 0.023 \cdot Re^{0.8} \cdot Pr^{0.333}$$

$$\psi = 1.826 \cdot \frac{P}{D} - 1.0430$$

Alternative Configuration

The procedure followed is under determined and can lead to a non-uniquely defined configuration. However, by playing with the numbers (and in particular with the tube dimensions and number) it can be realized that not many combinations of tube dimensions and number lead to reasonable flow conditions and tube length. The trends may look counter-intuitive at first, but being the flow rates fixed, the tube length is increased considerably when the tube diameter is increased and the tube number accordingly reduced to preserve turbulent flow. Table 4 shows values when the tube outside diameter is assumed to be ¾ inch vs. ½ inch as in the reference case, while the tube thickness is kept constant.

TABLE 4

Regenerative Heat Exchanger Design with ¾ inch OD Diameter

Input Parameters

| Number of Tubes | 144 |
|---|---|
| Tubes Array | 12 × 12 - Square |
| Tube Outside Diameter [m] | 0.01905 |

TABLE 4-continued

Regenerative Heat Exchanger Design with ¾ inch OD Diameter

| | |
|---|---|
| Tube Thickness [m] | 0.0015875 |
| Tube Pitch/Diameter Ratio | 1.25 |

Calculated Parameters

| | |
|---|---|
| Tube Length [m] | 9.32 |

| | Tube Side | Shell Side |
|---|---|---|
| Mass Flux [kg/(s · m$^2$)] | 121 | 116 |
| Average Density [kg/m$^3$] | 915 | 854 |
| Average Flow Velocity [m/s] | 0.13 | 0.14 |
| Average Dynamic Viscosity [Pa · s] | 0.00017222 | 0.000125999 |
| Average Reynolds Number | 11165 | 17497 |
| Average Prandtl Number | 0.9 | 0.86 |
| Average Nusselt Number | 38 | 67 |
| Average Thermal Conductivity [W/(m · K)] | 0.675 | 0.664 |
| Average Heat Transfer Coefficient [W/(m$^2$ · K)] | 1623 | 2343 |

As can be seen from Table 4, by increasing the tube diameter it is possible to reduce the number of tubes and at the same time maintain the same flow conditions (similar Reynolds numbers) on both tube and shell side compared to the configuration shown in Table 3. However, the consequent decrease in the heat transfer coefficients needs to be compensated by an increased heat transfer area which translates into significantly longer tuber (9.32 m vs. 5.84 m).

EXAMPLE IX

To verify and validate the analytic approach above presented, the regenerative heat exchanger was modeled in GPASS. The model developed to test the single component is show in FIG. 26 below:

The heat transfer correlation implemented in GPASS for the tube side is the Gnielinski correlation, more accurate than the Dittus-Boelter also because it was corrected by including entrance length effects which increase the local heat transfer coefficient. The regenerative heat exchanger was modeled in GPASS as a shell and tube heat exchanger with ten axial nodes. The imposed boundary conditions were the temperature, pressure and flow rates at the two inlets of the heat exchanger (points #1 and #2 as indicated in FIG. 26). The calculated values were the outlet conditions on both shell and tube sides (points #3 and #4 in FIG. 26). The heat exchanger length was calculated iteratively by imposing the total heat transfer to be equal to the nominal value of 3.22 MWth. Table 5 reports the main results obtained through the numerical model:

TABLE 5

GPASS Results for the Regenerative Heat Exchanger Parameters of Interest

| | |
|---|---|
| Heat Transfer Rate [MW] | 3.223 |
| Heat Exchanger Length [m] | 5.5 |

| | Tube Side | Shell Side |
|---|---|---|
| Inlet Pressure [MPa]\ | 15.5 | 15.5 |
| Flow Rate [kg/s] | 3.45 | 4.70 |
| Inlet Temperature [° C.] | 54 | 293 |
| Outlet Temperature [° C.] | 268.1 | 143.6 |

By comparing Table 4 with Table 3, it can be noted that the required heat exchanger length calculated through GPASS is smaller than the one calculated analytically by about 34 cm. The reason for this difference is in the inclusion in GPASS of the entrance length effects, which improve the local (and therefore also the global) heat transfer coefficient. With a higher overall heat transfer coefficient, a smaller heat transfer area is required for a given heat transfer rate which is in this case fixed at 3.22 MW. By comparing Table 5 with Table 2, a very small difference in the exit temperatures can also be observed (143.6° C. vs. 143° C. and 268.1° C. vs. 269° C.). Such a small discrepancy can be attributed to the property tables used for the conversion from enthalpy to temperature.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of performing transient multivariable sensor evaluation in a system, comprising the steps of,
    identifying a model form corresponding to the system;
    providing training measurement data;
    generating a basis vector;
    receiving, from a plurality of sensors, system data;
    loading the system data;
    performing an estimation to provide desired data; and
    identifying a defective sensor and system data associated therewith within the plurality of sensors by comparing the system data to the desired data and outputting an alarm for the defective sensor; and
    generating an estimator to replace the identified defective sensor system data with a value based upon the plurality of sensor's system data excluding the identified defective sensor system data.

2. The method as defined in claim 1 wherein the model form comprises an auto-regressive moving average (ARMA) form.

3. The method as defined in claim 2 wherein the ARMA form comprises,
    $E\delta Z_k=0$, where $$E = [\, I \quad A_1 \quad A_2 \quad \ldots \quad A_n \quad -C_0 \quad -C_1 \quad \ldots -C_n\,] \text{ and}$$

$$\delta Z_k = \begin{bmatrix} \delta y_k \\ \delta y_{k-1} \\ \vdots \\ \delta y_{k-n} \\ \delta u_k \\ \delta u_{k-1} \\ \vdots \\ \delta u_{k-n} \end{bmatrix}.$$

4. The method as defined in claim 3 wherein the ARMA form for causality operation comprises, $$[A \quad -C]\begin{bmatrix} \delta Y \\ \delta U \end{bmatrix} = 0$$

where $$A = [\, I \quad A_1 \quad A_2 \quad \ldots \quad A_n\,] \quad C = [\, C_0 \quad C_1 \quad \ldots \quad C_n\,]$$

and $$\delta Y = \begin{bmatrix} \delta y_k \\ \delta y_{k-1} \\ \vdots \\ \delta y_{k-n} \end{bmatrix} \quad \delta U = \begin{bmatrix} \delta u_k \\ \delta u_{k-1} \\ \vdots \\ \delta u_{k-n} \end{bmatrix}.$$

5. The method as defined in claim 4 wherein the ARMA form for input controllable operation comprises $[\delta Y_1 \delta Y_2 \ldots \delta Y_{K-n}]^T [C_L^{-1} A]^T = [\delta U_1 \delta U_2 \ldots \delta U_{K-n}]^T$ 6. The method as defined in claim 4 wherein the ARMA form for output observable operation comprises, $[\delta Y_1 \delta Y_2 \ldots \delta Y_K] = A_L^{-1} C [\delta U_1 \delta U_2 \ldots \delta U_{K-n}]$ $[\delta U_1 \delta U_2 \ldots \delta U_{K-n}]^T [A_L^{-1} C]^T = [\delta Y_1 \delta Y_2 \ldots \delta Y_{K-n}]^T$ 7. The method as defined in claim 4 wherein the ARMA form is re-cast into a reduced form based on the following two mathematical properties of stable physical systems, $h_{ij}[n]=0$, $n<0$ and $\Sigma_{n=-\infty}^{\infty}|h_{ij}[n]|=\Sigma_{n=0}^{\infty}|h_{ij}[n]|<\infty$, where h represents a physical component and $h[n]=x[n]=\Sigma_{n=-\infty}^{\infty} h[k]x[n-k]$ and in a discrete time domain becomes, $$\begin{pmatrix} y_1[n] \\ \vdots \\ y_l[n] \end{pmatrix} = \begin{pmatrix} h_{11}[n] & \cdots & h_{1m}[n] \\ \vdots & \ddots & \vdots \\ h_{l1}[n] & \cdots & h_{lm}[n] \end{pmatrix} * \begin{pmatrix} x_1[n] \\ \vdots \\ x_m[n] \end{pmatrix}$$

$$\begin{pmatrix} h_{11}[0] & \cdots & h_{11}[K] & \cdots & h_{1m}[0] & \cdots & h_{1m}[K] & -1 & \cdots & 0 \\ \vdots & & & & & & & & & \\ h_{l1}[0] & \cdots & h_{l1}[K] & \cdots & h_{lm}[0] & \cdots & h_{lm}[K] & 0 & \cdots & -1 \end{pmatrix}.$$

$$\begin{pmatrix} x_1[n] \\ \vdots \\ x_1[n-K] \\ \vdots \\ x_m[n] \\ \vdots \\ x_m[n-K] \\ y_1[n] \\ \vdots \\ y_l[n] \end{pmatrix} = 0.$$

8. The method as defined in claim 7 wherein the step of generating the basis vectors comprises specifying normal sensor measurement accuracy, initializing number of time lags to zero, generating a training matrix from measurements of the system data by applying $A=(X_1 \ldots X_r)$ computing a singular value decomposition of the training data matrix by applying, $X_n \in \text{null}(C)$; and testing whether σ points are less than the normal sensor measurement accuracy, and if is less than, then form the matrix of the basis vectors, and if not less than the normal sensor measurement accuracy, increment by K and return to composing the training data matrix step and then recycling until the σ points are less than the normal sensor measurement accuracy.

9. A system for performing transient multivariable sensor evaluation, comprising:

a plurality of sensors;

a computer system in communication with the plurality of sensors; the computer system having a non-transient memory with a computer software program and a mathematical representation of the system and basis vectors stored therein for executing instructions to;

receive system data from the plurality of sensors;

perform an estimation to provide desired data; and compare the system data to the desired data;

identify defective sensors and outputting an alarm for defective sensors;

generate an estimator to replace the identified defective sensor system data with a value based upon the plurality of sensor's system data excluding the identified defective sensor system data.

10. The system of claim 9, wherein the computer system includes instructions to execute the steps of identifying a model form.

11. The system of claim 9, wherein the system comprises a heat exchanger.

12. The system as defined in claim 10 wherein the model form comprises an auto-regressive moving average (ARMA) form.

* * * * *